(12) United States Patent
Haartsen

(10) Patent No.: US 7,016,372 B2
(45) Date of Patent: Mar. 21, 2006

(54) DYNAMIC BANDWIDTH ALLOCATION IN AD HOC WIRELESS PICONETS

(75) Inventor: Jacobus C. Haartsen, BG Hardenberg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 926 days.

(21) Appl. No.: 10/079,572

(22) Filed: Feb. 22, 2002

(65) Prior Publication Data

US 2002/0167961 A1 Nov. 14, 2002

Related U.S. Application Data

(60) Provisional application No. 60/271,715, filed on Feb. 28, 2001.

(51) Int. Cl.
*H04L 12/43* (2006.01)

(52) U.S. Cl. .................................. 370/461; 370/458
(58) Field of Classification Search ............ 370/230.1, 370/447, 449, 347, 395.1, 461, 458; 375/131; 455/426.1
See application file for complete search history.

(56) References Cited

U.S. PATENT DOCUMENTS

| | | | |
|---|---|---|---|
| 4,763,323 A | 8/1988 | Nelson et al. | 370/449 |
| 5,896,375 A | 4/1999 | Dent et al. | 370/347 |
| 5,940,431 A | 8/1999 | Haartsen et al. | 375/131 |
| 6,026,297 A | 2/2000 | Haartsen | 455/426.1 |
| 6,501,731 B1 * | 12/2002 | Chong et al. | 370/230.1 |
| 6,909,723 B1 * | 6/2005 | Yonge et al. | 370/447 |

FOREIGN PATENT DOCUMENTS

EP 0398380 A2 11/1990

OTHER PUBLICATIONS

R. Rao et al, "Demand-based Bluetooth scheduling", 3$^{rd}$ IEEE Wireless LAN Conference, Online! Sep. 2001, XPO02225481.
D. Bertsekas et al., "Data Networks", 2$^{nd}$Edition, Prentice Hall, London, 1992.
IEEE 802.11-1997, "Part 11: Wireless LAN Medium Access Control (MAC) and Physical Layer (PHY) specifications".
ETSI Technical Report ETR 069, Feb. 1993: "Radio Equipment and Systems (RES): High Performance Radio Local Area Network (HIPERLAN) Services and facilities".
A. Kamerman, "Spread-Spectrum Techniques Drive WLAN Performance", Microwaves & RF, Sep. 1996, pp. 109-114.
ETSI, Final Draft pr ETS 300 652, Jun. 1996, Radio Equipment and Systems (RES): High Performance Radio Local Area Networks (HIPERLAN) Type 1; "Functional Specification".

(Continued)

*Primary Examiner*—John Pezzlo
(74) *Attorney, Agent, or Firm*—PotomacPatentGroupPLLC

(57) ABSTRACT

One of a number, n, of slave devices is selected for express or implicit polling by a master device in a communication system that transmits during individual ones of a number of sequentially occurring time slots. This is done by assigning a corresponding priority level to each slave device, wherein at least two slave devices are assigned different corresponding priority levels. A corresponding count parameter and a corresponding initial count value are assigned to each of the slave devices. For each of the slave devices, the corresponding count parameter is initialized to the corresponding initial count value. For each successive time slot, each of the count parameters is adjusted (e.g., by decrementing). A highest priority slave device whose corresponding count parameter has reached or passed a predetermined value is selected for polling.

36 Claims, 14 Drawing Sheets

OTHER PUBLICATIONS

H. Takagi, "Exact Analysis of round-robin scheduling of services", IBM J.Res. Develop. vol. 31, No. 4, Jul. 1987, pp. 484-488.

H. Takagi, "Queuing Analysis of Polling Models", ACM Computing Surveys, vol. 20, No. 1, Mar. 1988, pp. 5-28.

N. Johansson et al., "Performance Evaluation of Scheduling Algorithms for Bluetooth", Proc. of IFIP TC6, 5th Intl. Conf. on Broadband Communication 1999, Hong Kong, Nov. 10-12, 1999.

"Specification of the Bluetooth system", V1.08, Dec. 1, 1999.

* cited by examiner

```
slot  c(1)  c(2)  c(3)
 0    12    8     6
 1    11    7     5
 2    10    6     4
 3     9    5     3
 4     8    4     2
 5     7    3     1
 6     6    2     0    TX to C
 7     5    1     5    RX from C
 8     4    0     4    TX to B
 9     3    7     3    RX from B
10     2    6     2
11     1    5     1
12     0    4     0    TX to A
13    11    3    -1    RX from A
14    10    2    -2    TX to C
15     9    1     3    RX from C
16     8    0     2    TX to B
17     7    7     1    RX from B
18     6    6     0    TX to C
19     5    5     5    RX from C
20     4    4     4
21     3    3     3
22     2    2     2
23     1    1     1
24     0    0     0    TX to A
25    11   -1    -1    RX from A
26    10   -2    -2    TX to B
27     9    5    -3    RX from B
28     8    4    -4    TX to C
29     7    3     1    RX from C
30     6    2     0    TX to C
31     5    1     5    RX from C
32     4    0     4    TX to B
33     3    7     3    RX from B
34     2    6     2
35     1    5     1
36     0    4     0    TX to A
37    11    3    -1    RX from A
38    10    2    -2    TX to C
39     9    1     3    RX from C
40     8    0     2    TX to B
41     7    7     1    RX from B
42     6    6     0    TX to C
43     5    5     5    RX from C
44     4    4     4
45     3    3     3
46     2    2     2
47     1    1     1
48     0    0     0    TX to A
49    11   -1    -1    RX from A
50    10   -2    -2    TX to B
51     9    5    -3    RX from B
52     8    4    -4    TX to C
53     7    3     1    RX from C
54     6    2     0    TX to C
55     5   -1     5    RX from C
56     4    0     4    TX to B
57     3    7     3    RX from B
58     2    6     2
59     1    5     1
```

FIG. 7

| slot | C(1) | C(2) | C(3) | | |
|---|---|---|---|---|---|
| 0 | 4 | 8 | 6 | | |
| 1 | 3 | 7 | 5 | | |
| 2 | 2 | 6 | 4 | | |
| 3 | 1 | 5 | 3 | | |
| 4 | 0 | 4 | 2 | TX to | A |
| 5 | 3 | 3 | 1 | RX from | A |
| 6 | 2 | 2 | 0 | TX to | C |
| 7 | 1 | 1 | 5 | RX from | C |
| 8 | 0 | 0 | 4 | TX to | A |
| 9 | 3 | -1 | 3 | RX from | A |
| 10 | 2 | -2 | 2 | TX to | B |
| 11 | 1 | 5 | 1 | RX from | B |
| 12 | 0 | 4 | 0 | TX to | A |
| 13 | 3 | 3 | -1 | RX from | A |
| 14 | 2 | 2 | -2 | TX to | C |
| 15 | 1 | 1 | 3 | RX from | C |
| 16 | 0 | 0 | 2 | TX to | A |
| 17 | 3 | -1 | 1 | RX from | A |
| 18 | 2 | -2 | 0 | TX to | B |
| 19 | 1 | 5 | -1 | RX from | B |
| 20 | 0 | 4 | -2 | TX to | A |
| 21 | 3 | 3 | -3 | RX from | A |
| 22 | 2 | 2 | -4 | TX to | C |
| 23 | 1 | 1 | 1 | RX from | C |
| 24 | 0 | 0 | 0 | TX to | A |
| 25 | 3 | -1 | -1 | RX from | A |
| 26 | 2 | -2 | -2 | TX to | B |
| 27 | 1 | 5 | -3 | RX from | B |
| 28 | 0 | 4 | -4 | TX to | A |
| 29 | 3 | 3 | -5 | RX from | A |
| 30 | 2 | 2 | -6 | TX to | C |
| 31 | 1 | 1 | -1 | RX from | C |
| 32 | 0 | 0 | -2 | TX to | A |
| 33 | 11 | -1 | -3 | RX from | A |
| 34 | 10 | -2 | -4 | TX to | B |
| 35 | 9 | 5 | -5 | RX from | B |
| 36 | 8 | 4 | -6 | TX to | C |
| 37 | 7 | 3 | -1 | RX from | C |
| 38 | 6 | 2 | -2 | TX to | C |
| 39 | 5 | 1 | 3 | RX from | C |
| 40 | 4 | 0 | 2 | TX to | B |
| 41 | 3 | 7 | 1 | RX from | B |
| 42 | 2 | 6 | 0 | TX to | C |
| 43 | 1 | 5 | 5 | RX from | C |
| 44 | 0 | 4 | 4 | TX to | A |
| 45 | 11 | 3 | 3 | RX from | A |
| 46 | 10 | 2 | 2 | | |
| 47 | 9 | 1 | 1 | | |
| 48 | 8 | 0 | 0 | TX to | B |
| 49 | 7 | 7 | -1 | RX from | B |
| 50 | 6 | 6 | -2 | TX to | C |
| 51 | 5 | 5 | 3 | | |
| 52 | 4 | 4 | 2 | | |
| 53 | 3 | 3 | 1 | | |
| 54 | 2 | 2 | 0 | TX to | C |
| 55 | 1 | 1 | 5 | RX from | C |

FIG. 8

```
slot C(1) C(2) C(3)
  0   12   6  18
  1   11   5  17
  2   10   4  16
  3    9   3  15
  4    8   2  14
  5    7   1  13
  6    6   0  12    TX to B
  7    5   5  11    RX from B
  8    4   4  10
  9    3   3   9
 10    2   2   8
 11    1   1   7
 12    0   0   6    TX to A
 13    3  -1   5    TX to A
 14    2  -2   4    TX to A
 15    1  -3   3    RX from A
 16    0  -4   2    TX to B
 17   11   1   1    RX from B
 18   10   0   0    TX to B
 19    9   5  -1    RX from B
 20    8   4  -2    TX to C
 21    7   3  15    RX from C
 22    6   2  14    RX from C
 23    5   1  13    RX from C
 24    4   0  12    RX from C
 25    3  -1  11    RX from C
 26    2  -2  10    TX to B
 27    1   3   9    RX from B
 28    0   4   8    TX to A
 29   11   3   7    TX to A
 30   10   2   6    TX to A
 31    9   1   5    RX from A
 32    8   0   4    TX to B
 33    7   5   3    RX from B
 34    6   4   2
 35    5   3   1
 36    4   2   0    TX to C
 37    3   1  17    RX from C
 38    2   0  16    RX from C
 39    1  -1  15    RX from C
 40    0  -2  14    RX from C
 41   -1  -3  13    RX from C
 42   -2  -4  12    TX to A
 43    9  -5  11    TX to A
 44    8  -6  10    TX to A
 45    7  -7   9    RX from A
 46    6  -8   8    TX to B
 47    5  -3   7    RX from B
 48    4   2   6    TX to B
 49    3   1   5    RX from B
 50    2   0   4    TX to B
 51    1   5   3    RX from B
 52    0   4   2    TX to A
 53   11   3   1    TX to A
 54   10   2   0    TX to A
 55    9   1  -1    RX from A
```

FIG. 11

| slot | C(1) | C(2) | C(3) | |
|------|------|------|------|------|
| 0 | 6 | 8 | 8 | |
| 1 | 5 | 7 | 7 | |
| 2 | 4 | 6 | 6 | |
| 3 | 3 | 5 | 5 | |
| 4 | 2 | 4 | 4 | |
| 5 | 1 | 3 | 3 | |
| 6 | 0 | 2 | 2 | TX to A |
| 7 | 5 | 1 | 1 | RX from A |
| 8 | 4 | 0 | 0 | TX to B |
| 9 | 3 | 5 | -1 | RX from B |
| 10 | 2 | 4 | -2 | TX to C |
| 11 | 1 | 3 | 5 | RX from C |
| 12 | 0 | 2 | 4 | TX to A |
| 13 | 5 | 1 | 3 | RX from A |
| 14 | 4 | 0 | 2 | TX to B |
| 15 | 3 | 5 | 1 | RX from B |
| 16 | 2 | 4 | 0 | TX to C |
| 17 | 1 | 3 | 7 | RX from C |
| 18 | 0 | 2 | 0 | TX to A |
| 19 | 5 | 1 | -1 | RX from A |
| 20 | 4 | 0 | -2 | TX to B |
| 21 | 3 | 5 | -3 | RX from B |
| 22 | 2 | 4 | -4 | TX to C |
| 23 | 1 | 3 | 3 | RX from C |
| 24 | 0 | 2 | 2 | TX to A |
| 25 | 5 | 1 | 1 | RX from A |
| 26 | 4 | 0 | 0 | TX to B |
| 27 | 3 | 5 | -1 | RX from B |
| 28 | 2 | 4 | -2 | TX to C |
| 29 | 1 | 3 | 5 | RX from C |
| 30 | 0 | 2 | 4 | TX to A |
| 31 | 5 | 1 | 3 | RX from A |
| 32 | 4 | 0 | 2 | TX to B |
| 33 | 3 | 5 | 1 | RX from B |
| 34 | 2 | 4 | 0 | TX to C |
| 35 | 1 | 3 | 7 | RX from C |
| 36 | 0 | 2 | 6 | TX to A |
| 37 | 5 | 1 | 5 | RX from A |
| 38 | 4 | 0 | 4 | TX to B |
| 39 | 3 | 5 | 3 | RX from B |
| 40 | 2 | 4 | 2 | |
| 41 | 1 | 3 | 1 | |
| 42 | 0 | 2 | 0 | TX to A |
| 43 | 5 | 1 | -1 | RX from A |
| 44 | 4 | 0 | -2 | TX to B |
| 45 | 3 | 5 | -3 | RX from B |
| 46 | 2 | 4 | -4 | TX to C |
| 47 | 1 | 3 | 3 | RX from C |

FIG. 13

| slot | C(1) | C(2) | C(3) | |
|---|---|---|---|---|
| 0 | 6 | 6 | 8 | |
| 1 | 5 | 5 | 7 | |
| 2 | 4 | 4 | 6 | |
| 3 | 3 | 3 | 5 | |
| 4 | 2 | 2 | 4 | |
| 5 | 1 | 1 | 3 | |
| 6 | 0 | 0 | 2 | TX to A |
| 7 | 5 | -1 | 1 | RX from A |
| 8 | 4 | -2 | 0 | TX to B |
| 9 | 3 | 3 | -1 | RX from B |
| 10 | 2 | 2 | -2 | TX to C |
| 11 | 1 | 1 | 5 | RX from C |
| 12 | 0 | 0 | 4 | TX to A |
| 13 | 5 | -1 | 3 | RX from A |
| 14 | 4 | -2 | 2 | TX to B |
| 15 | 3 | 3 | 1 | RX from B |
| 16 | 2 | 2 | 0 | TX to C |
| 17 | 1 | 1 | 7 | RX from C |
| 18 | 0 | 0 | 0 | TX to A |
| 19 | 5 | -1 | -1 | RX from A |
| 20 | 4 | -2 | -2 | TX to B |
| 21 | 3 | 3 | -3 | RX from B |
| 22 | 2 | 2 | -4 | TX to C |
| 23 | 1 | 1 | 3 | RX from C |
| 24 | 0 | 0 | 2 | TX to A |
| 25 | 5 | -1 | 1 | RX from A |
| 26 | 4 | -2 | 0 | TX to B |
| 27 | 3 | 3 | -1 | RX from B |
| 28 | 2 | 2 | -2 | TX to C |
| 29 | 1 | 1 | 5 | RX from C |
| 30 | 0 | 0 | 4 | TX to A |
| 31 | 5 | -1 | 3 | RX from A |
| 32 | 4 | -2 | 2 | TX to B |
| 33 | 3 | 3 | 1 | RX from B |
| 34 | 2 | 2 | 0 | TX to C |
| 35 | 1 | 1 | 7 | RX from C |
| 36 | 0 | 0 | 6 | TX to A |
| 37 | 5 | -1 | 5 | RX from A |
| 38 | 4 | -2 | 4 | TX to B |
| 39 | 3 | 3 | 3 | RX from B |
| 40 | 2 | 2 | 2 | |
| 41 | 1 | 1 | 1 | |
| 42 | 0 | 0 | 0 | TX to A |
| 43 | 5 | -1 | -1 | RX from A |
| 44 | 4 | -2 | -2 | TX to B |
| 45 | 3 | 3 | -3 | RX from B |
| 46 | 2 | 2 | -4 | TX to C |
| 47 | 1 | 1 | 3 | RX from C |

FIG. 14

DYNAMIC BANDWIDTH ALLOCATION IN AD HOC WIRELESS PICONETS

CROSS REFERENCE TO RELATED APPLICATIONS

This application claims the benefit of U.S. Provisional Application No. 60/271,715, filed Feb. 28, 2001, which is hereby incorporated herein by reference in its entirety.

BACKGROUND

This invention relates to communications networks. More particularly, it relates to bandwidth allocation in a network controlled by a central traffic scheduler, and to methods and embodiments of a scheduling algorithm that improves throughput of asynchronous services.

Radio Local Area Networks (LAN) typically cover an area of technology where the computer industry and the wireless communications industry merge. Conventional computer networking has relied on wired LANs, typically packet-switched and targeted for data transfer. By contrast, wireless networking, and in particular cellular networking, has relied on wide area networks, typically circuit-switched and targeted for voice transfer. Most efforts in the design of radio LANs have reused the principles that are used in wired LANs. This, however, is a questionable procedure because the environments of the wired medium and of the wireless medium differ in important ways. Moreover, multimedia communications require additional features due to the special traffic characteristics posed by data, voice and video. Finally, the residential environment has its own requirements, which can be decisive for the design of the system. Almost one hundred percent of the computer networks today use a wired infrastructure. The wired medium can range from a simple twisted pair to an optical fiber. Due to its shielded and controllable environment, the wired medium is characterized by low interference levels and stable propagation conditions. Consequently, the wired medium has potential for high to very high data rates. Because of the latter, all participants in wired LANs typically share this single medium. The medium constitutes a single channel, which is used by only a single one of a number of different users at any given time. Time-division multiplexing (TDM) is used to allow different users to access the channel at different times. The protocols for accessing wired media have been standardized by the IEEE in its 802 series. Typically, multiple access reservation techniques like carrier-sensing (e.g., Ethernet, 802.3 Carrier-Sense Multiple Access/Collision Detect (CSMA/CD)) or tokens (e.g., 802.4 token buses, or 802.5 token rings) are used to gain access to the medium. These protocols can be used in a distributed sense in that the user occupying the channel reserves the medium by its present transmission or by its token. In these schemes, every user can hear all traffic. That is, in a single LAN, all users share not only the channel, but also all of the information carried on that channel. When the number of participants grows, the LAN can be divided into smaller LANs or segments, which channels operate independently. LANs can be interconnected via bridges or routers, which form interfaces between the different local networks. These configurations result in more complex networks. For examples of this background information, reference is made to D. Bertsekas and R. Callager, Data Networks, $2^{nd}$ Edition, Prentice-Hall, London, 1992. For the discussion of the residential LANs, it suffices to consider the single LAN. The LAN typically provides a connectionless packet-switched service. Each packet has a destination address (and usually a source address as well) so that each user can determine whether the packet that passes by is intended for him or not. It will be understood that the net throughput per user in a single LAN is determined by the peak data rate on the channel and by the number of users that share this channel. Even if the peak data rate is very high due to the wide bandwidth of the wireline medium, the effective user throughput can be low if the channel has to be shared among many users.

Since the type of communication that takes place over current wired LANs is asynchronous and connectionless, it is ill suited for supporting delay-critical services like voice. Voice services demand synchronous or isochronous connections, which require priority techniques in the Medium Access Control (MAC) protocols in order to give voice users precedence over non-voice users. Different studies in existing data networks have shown that this is not a trivial task. During the last several years, standards bodies in the United States and in Europe have worked on wireless LANs (WLANs). In the United States, this has resulted in the IEEE 802.11 standard (Draft standard IEEE 802.11, P802.11/D1, December 1994), whereas in Europe this has resulted in the ETSI HIPERLAN standard (ETSI, RES10/96/etr, "Radio Equipment and Systems (RES); High Performance Radio Local Area Networks (HIPERLANs), July 1996). Looking first at the IEEE 802.11 standard, as the name indicates, it is an extension of the 802 LAN standard. The wireless connection is either a radio link or an infrared link. The radio medium is the Industrial, Scientific, Medical (ISM) band at 2.4 GHz. However, for a single radioLAN, only a 1–2 Mb/s channel is available at any given time. This relatively narrow channel has to be shared among all participants of the radio network. Both a configuration based on a wired infrastructure and a configuration based on an ad-hoc structure have been defined. With a wired infrastructure, the radio system merely provides a wireless extension between the wired LAN and the user terminal. Fixed access points interface between the wireline domain and wireless domain. In an ad-hoc network, wireless units create their own wireless network. No wired backbone is involved at all. It is the ad-hoc nature provided with wireless communication that gives the WLANs an important advantage over wired LANs in certain applications.

To avoid interference with other networks or other applications in the 2.4 GHz ISM band, either direct-sequence spreading or slow frequency hopping is used. Access to the channel is accomplished by a special form of Carrier-Sense Multiple Access/Collision Avoidance (CSMA/CA) that provides a connectionless service. In an architecture based on a wired infrastructure, the fixed part takes the role of a central controller, which schedules all traffic. In an ad-hoc architecture, the distributed CSMA/CA protocol provides the multiple access to the channel. All in all, the IEEE 802.11 standard is very similar to that of the wired Ethernet, with the wire being replaced by a 1 Mb/s radio channel. It will be understood that the effective user throughput decreases quickly when the number of participants increases. In addition, since the spreading factor for Direct Sequence Spread Spectrum (DSSS) is only 11 and the hop rate for Frequency Hopping Spread Spectrum (FHSS) is only on the order of 10 to 20 hops/s, little immunity is provided against interference in the ISM band. Different networks can theoretically coexist in the same area (different networks either use different DSSS carrier frequencies of which seven are defined, or use different FHSS hop sequences), thereby increasing the aggregate throughput. In fact, in A. Kamerman, "Spread- Spectrum Techniques Drive WLAN Performance," Microwaves &: RF, September 1996, pp. 109–114, it was claimed that the aggregate throughput, defined as the average throughput per user times the number of collocated users (not necessarily participating in the same network), can never exceed 4–6 Mb/s with either technology. For collocating different networks under the IEEE 802.11 standard it is preferred that the networks be based on a wired infrastructure: a limited number of collocated fixed access points can create their own network. A certain amount of coordination via the wired network is then possible. However, for networks based on an ad-hoc structure, this is much more difficult under IEEE 802.11 because the MAC protocol does not lend itself to this creation. Instead, units that come in range of an ad-hoc network will join an existing network and not create their own network.

HIPERLAN has followed a similar path as IEEE 802.11. The system operates in the 5.2 GHz band (not available in the United States). The standard is still under development and consists of a family of sub-standards, HIPERLAN 1 to 4. The most basic part, HIPERLAN 1 (ETSI, ETS300652, "Radio Equipment and Systems (RES); High Performance Radio Local Area Networks (HIPERLAN) Type 1; "Functional Specification", June 1996), is similar to the IEEE 802.11 standard. Again, a single channel is used, but with a higher peak data rate of 23.5 Mb/s. A dedicated CSMA/CA scheme is used, called Elimination-Yield Non-Preemptive Priority Multiple Access (EY-NPMA) which provides a number of contention-based phases before the channel is reserved. Although the 5.2 GHz band is unlicensed in Europe, only HIPERLAN-type applications are allowed. Therefore, no special measures against unknown jammers are implemented. Different networks can coexist in the same area provided different 23 MHZ wide channels are used. Out of the 5.2 GHz, five such channels have been defined. One other interesting activity in the HIPERLAN area is the HIPERLAN 2 standardization, which concentrates on wireless Asynchronous Transfer Mode (ATM). Presumably, this wireless network will also use the 5.2 GHz band, will support peak data rates exceeding 40 Mb/s, and will use a centralized access scheme with some kind of demand assignment MAC scheme.

What the existing WLAN systems have in common with the wired LANs is that a single channel is shared among all the participants of the local network. All users share both the medium itself and all information carried over this medium. In the wired LAN, this channel encompasses the entire medium. However, this is not so in the radioLANs. In the radioLANs, the radio medium typically has a bandwidth of 80 to 100 MHZ. Due to implementation limitations and cost of the radio transceivers, and due to restrictions placed by regulatory bodies like the FCC and ETSI, it is virtually impossible to define a radio channel in the radioLAN with the same bandwidth as the radio medium. Therefore, only part of the radio medium is used in a single LAN. As a result, the peak data rate over the channel decreases. But more importantly, the effective user throughput decreases because all participants share this channel, which is now much smaller than the medium. Although the medium is divided into different channels, each of which can be used to set up a different radioLAN, in practice, only a single network covers a certain area, especially when it concerns ad-hoc networks. In radioLANs based on a wired infrastructure, the different channels can be used to create cells, each cell with its own network that is not or minimally disturbed by neighboring cells. This result is achieved at the expense of effort in planning the allocation of channels. In this way, a cellular structure is created that is similar to those encountered in cellular mobile systems. The use of different ad-hoc radio networks in the same cell, however, is prohibited, thereby limiting the attainable aggregate throughput per unit area.

Ad-hoc networks, by definition, do not rely on the support of a wired infrastructure as is commonly applied in cellular, cordless and WLAN systems. In the latter systems, access to the wired backbone is accomplished by access points or base stations. These base stations broadcast known control signals to which the portable terminals can lock. Via the control signals, incoming and outgoing calls can be established and terminals can be directed to dedicated traffic channels. In conventional wireless systems, the activities of the base stations are highly coordinated. In ad-hoc systems, the situation is completely different. Since ad-hoc systems are based on peer-to-peer connectivity, there is no difference between base stations and terminals. Terminals could of course start to operate as base stations in order to facilitate connection establishment. However, in a peer environment, it is unclear which unit should be base station, when and for how long. It is very undesirable to have each radio unit broadcast control information because it is not at all certain whether other units are around to receive this information. In addition, it consumes valuable (battery) power and creates unnecessary interference.

A system called a BLUETOOTH™ system was recently introduced to provide ad-hoc connectivity between portable devices like mobile phones, laptops, PDAs, and other nomadic devices. This system applies frequency hopping to enable the construction of low-power, low-cost radios with a small footprint. The system supports both data and voice communication. The latter is optimized by applying fast frequency hopping with a nominal rate of 800 hops/s through the entire 2.4 GHz ISM band in combination with a robust voice coding. Automatic retransmission is applied on data packets to combat packet failures due to collisions between different piconets visiting the same hop channel. Devices based on the BLUETOOTH™ system concept can create so called piconets, which consist of a master device, and one or more slave devices connected via the FH piconet channel. The FH sequence used for the piconet channel is completely determined by the address or identity of the device acting as the master. The system clock of the master device determines the phase in the hopping sequence. In the BLUETOOTH™ system, each device has a free-running system clock. The slave devices add a time offset to their clocks such that they become aligned with the clock of the master device. By using the master address to select the proper hopping sequence and by using the time offset to align to the master clock, the slave devices keep in hop synchrony to the master device; that is, master and slave devices remain in contact by hopping synchronously to the same hop frequency or hop carrier. For more details, the reader is referred to U.S. Patent Application entitled "FH piconets in an uncoordinated wireless multi-user system," by J. C. Haartsen, U.S. patent application Ser. No. 08/932, 911 filed on Sep. 18, 1997, which is hereby incorporated herein by reference in its entirety.

In order to provide both low-priority asynchronous services as well as high-priority synchronous services, in BLUETOOTH™ systems, all information transfer is controlled by the master. The master and slaves alternatively transmit and receive radio packets in a Time Division Duplex (TDD) fashion. To prevent two or more slaves from transmitting simultaneously, which would result in a packet collision and packet failure at the master receiver, the master for each packet assigns the slave that is allowed to transmit. With this polling procedure, the master can prioritize traffic flows and can allocate bandwidths between the slaves efficiently. All traffic is contention free. Polling is achieved by the rule that a slave is only allowed to transmit in the current slave-to-master slot when it has received a packet from the master in the master-to-slave slot directly preceding the current slave-to-master slot. Each packet contains a slave address with which the master addresses the slave. If the master has something to transfer to the slave, the master packet will contain a payload with slave information. This type of packet is referred to throughout this disclosure as an implicit poll and the act of sending it is called "implicitly polling", since receipt of this packet allows the slave to respond. If the master has no information to send to the slave, it occasionally has to send a packet without a payload to the slave, just to enable the slave to send something to the master. This packet without a payload serves as a poll packet explicitly polling the slave, and the act of sending such a packet is referred to throughout the disclosure as "explicitly polling". The polling procedure used by the master determines the bandwidth allocation given to the slaves: when a slave is polled more often, it receives more bandwidth.

In the past, several polling schemes have been considered. Round-robin schemes, in which the master consecutively polls the slaves, is optimal when the throughput and latency requirements between the slaves are uniform. Descriptions of round-robin methods can be found in "Exact Analysis of round-robin scheduling of services," by Hodeaki Takagi, IBM J. Rs. Dev. 31, 4 (July), pp 484–488, and in "Queuing Analysis of Polling Models," by Hodeaki Takagi, ACM Computing Surveys, Vol. 20, No. 1, March 1988. To dynamically adjust to traffic offering, exhaustive polling can be applied which means that once a slave is allowed to start transmission, it will keep sending packets until its queue is empty. Only then will the master progress to the next slave. Combinations of round-robin and exhaustive polling have been described in "Performance Evaluation of Scheduling Algorithms for Bluetooth," by N. Johansson et al., Proc. of IFIP TC6, $5^{th}$ Int'l. Conf. On Broadband Communication 1999, Hong Kong, Nov. 10–12, 1999; such combinations are denoted as fair exhaustive polling. Polling schemes so far have taken into account desired throughput, and offered load. However, they have not properly addressed latency and service priority.

SUMMARY

There is, therefore, a need for methods and apparatuses for performing polling in a system in which a central unit (like a master or base station) controls the allocation of bandwidth. Depending on the throughput requirements, latency, and service priority of the information transfer both from the master to the slaves and from the slaves to the master, the master should be able to adapt its polling procedure.

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that select one of a number, n, of slave devices by a master device in a communication system that transmits during individual ones of a number of sequentially occurring time slots. This is done by assigning a corresponding priority level to each slave device, wherein at least two slave devices are assigned different corresponding priority levels. A corresponding count parameter and a corresponding initial count value are assigned to each of the slave devices. For each of the slave devices, the corresponding count parameter is initialized to the corresponding initial count value. For each successive time slot, each of the count parameters is adjusted (e.g., by decrementing). A highest priority slave device whose corresponding count parameter has reached or passed a predetermined value is selected.

In another aspect, the selected slave device is explicitly or implicitly polled, and the corresponding count parameter of the selected slave device is adjusted by an amount equal to the corresponding initial count value.

Although it is not an essential feature of the invention, in some embodiments the initial count value of at least one slave device is changed sometime after the selected slave has been explicitly or implicitly polled. Alternatively, or in addition, the corresponding priority levels of at least two of the slave devices may be reassigned sometime after the selected slave has been explicitly or implicitly polled. These techniques enable dynamic adjustment of resource allocation among the various slave devices.

BRIEF DESCRIPTION OF THE DRAWINGS

The objects and advantages of the invention will be understood by reading the following detailed description in conjunction with the drawings in which:

FIG. 7 is an example of operation of the polling scheme according to the invention;

FIG. 8 is another example of operation of the polling scheme according to the invention;

FIG. 11 is another example of operation of the polling scheme according to the invention;

FIG. 13 is another example of operation of the polling scheme according to the invention; and FIG. 14 is another example of operation of the polling scheme according to the invention.

DETAILED DESCRIPTION

Figure 1:
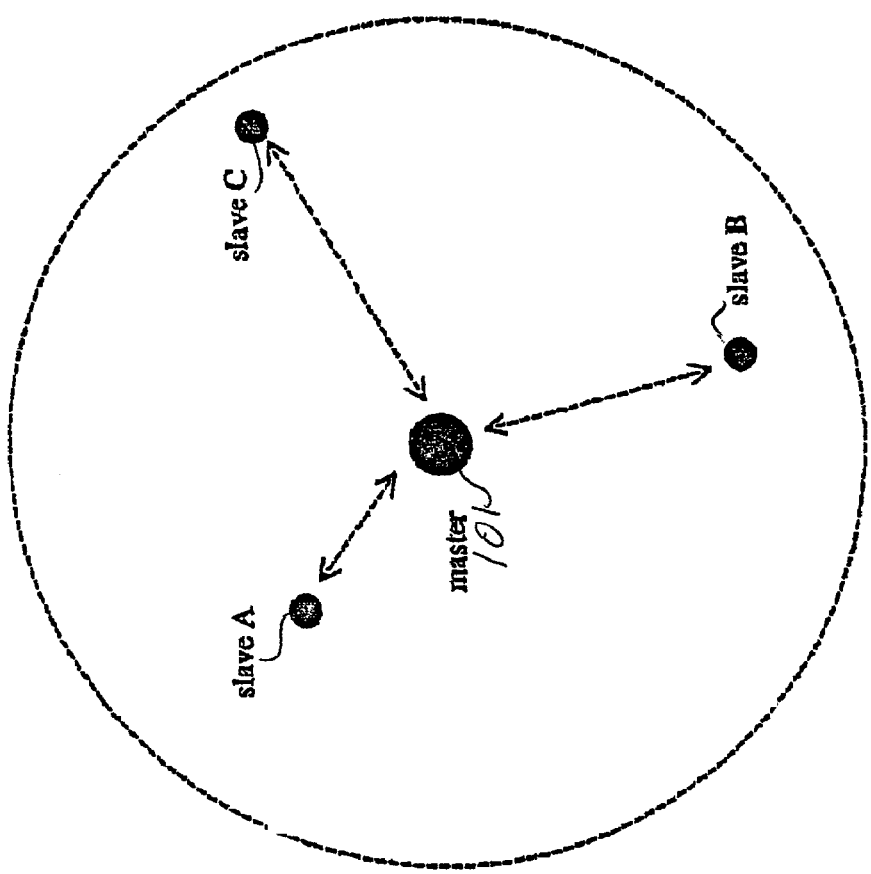
FIG. 1 depicts a star configuration between a master and several slaves.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An overview of a polling scheme will now be described in which the master dynamically adjusts the polling interval of the slaves. Depending on requested throughput, prioritization and maximal latency, the initial interval parameters of the polling mechanism are set. The polling interval parameters are then dynamically adjusted to adapt to instantaneous traffic conditions. The polling machine comprises a number of counters, each counter being associated with a slave. The counters are initialized with initial count values ("begin values") which determine the initial polling intervals and thus the bandwidth allocation. After each poll event (which can take one or more time slots), the counters are adjusted, for example by decrementing. When the value stored in a counter reaches or goes beyond a predetermined value (e.g., reaches zero or becomes negative), a poll event is scheduled for the slave associated with this counter. Then the counter is reset to its begin value.

The begin values can be changed in dependence on the traffic conditions. For example, when a slave is polled a number of times in vain (e.g., there is no data waiting at the slave), the master may decide to increase the counter begin value. In that case, the polling interval is increased and less bandwidth is allocated to this slave. Changes in bandwidth allocations for high-priority slaves automatically impact bandwidth allocations for low-priority slaves. The maximal polling interval will depend on the latency requirements set by the slave. If the slave does respond with information, the begin value may be reduced to increase the throughput to this slave and quickly empty a possible queue. The master ensures that while bandwidth allocations may change, minimal throughput for high-priority services (like slaves that maintain a synchronous connection) is guaranteed. The counters themselves are also associated with priority levels; if multiple counters reach the zero content level, the slave associated with the highest priority level is polled.

In exemplary embodiments described herein, the system is based on the FH radio air interface as described in U.S. application Ser. No. 08/685,069 entitled "Short-range radio communications system and method of use," by P. W. Dent and J. C. Haartsen, filed Jul. 23, 1996, and on the method of channel access described in U.S. Pat. No. 5,940,431 entitled "Access technique of channel hopping communications system," by J. C. Haartsen and P. W. Dent, granted Aug. 17, 1999. The concepts of connectivity for devices using this air interface are further described in U.S. application Ser. No. 08/932,911 entitled "FH piconets in an uncoordinated wireless multi-use system." by J. C. Haartsen, filed Sep. 18, 1997, and in U.S. application Ser. No. 08/932,244 entitled "Contemporaneous connectivity to multiple piconets" by J. C. Haartsen, filed Sep. 18, 1997. The mentioned air interface has been the foundation for the BLUETOOTH™ air interface, described in the "Specification of the Bluetooth system," v1.0 draft foundation, Jul. 5, 1999 (henceforth, "BLUETOOTH™ specification"). The U.S. Pat. No. 5,940,431; the U.S. application Ser. Nos. 08/685,069; 08/932,911; and 08/932,244; and the "BLUETOOTH™ specification are each hereby incorporated herein by reference in their entireties.

Figure 2:
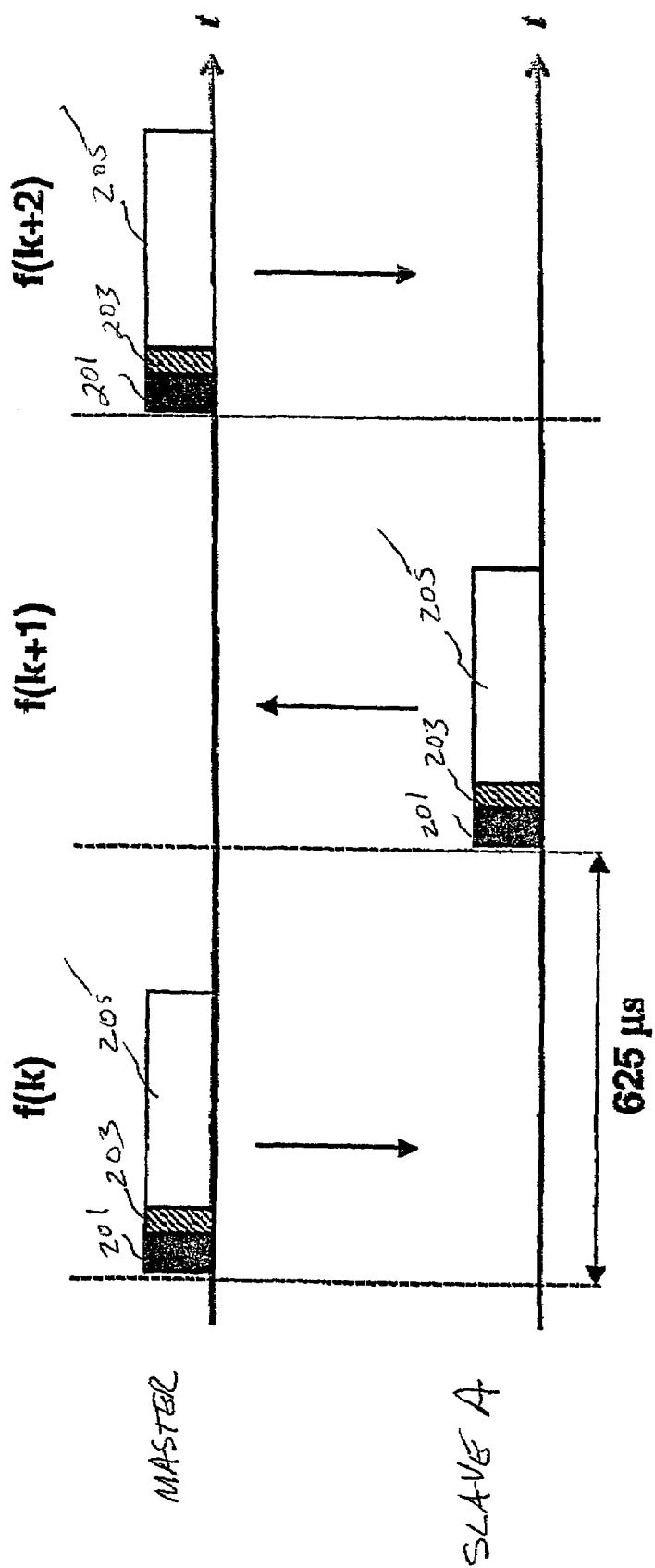
FIG. 2 depicts the flow of information in a frequency hopping/time-division duplex channel.
Figure 3:
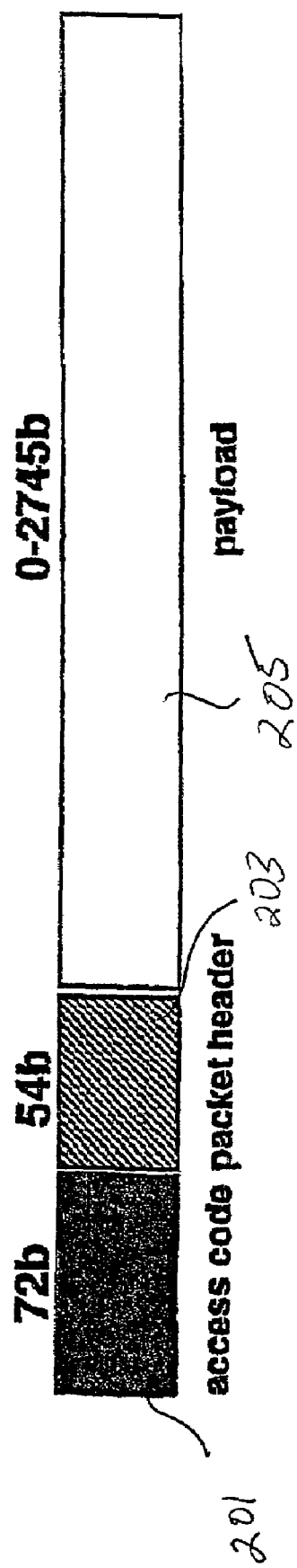
FIG. 3 depicts a known packet format in a BLUETOOTH™ system.

The considered air interface describes a physical interface where the transceiver alternately transmits and receives to support a duplex link, that is, in a so-called time-division duplex mode of operation. Time is divided into time slots with a slot duration of 625 $\mu$s. Each time slot is associated with a different hop frequency according to a pseudo-random hop pattern. As a result, the hop rate corresponds to 1600 hops/s. The hop pattern is determined by the identity of one of the units participating in the link. This unit, which can be an arbitrary unit, is assigned the master role. The remaining units are slave units. The phase in the hop pattern is determined by the native system clock of this master unit. During connection setup, the identity and clock value are transferred from the master unit to the slave so that both can use the same hopping pattern and phase and thus stay in synchrony. The master and one or more slaves form a piconet which is a star network with the master controlling the traffic. An exemplary piconet 100 is depicted in FIG. 1. In the example, a master 101 forms a piconet with slaves A, B, and C. The information over the hopping piconet channel is transferred by means of short packets. The packets are alternatively transmitted from one unit to the other unit and vice versa. The flow of information from a master unit (MASTER) to a slave unit A in an exemplary frequency hopping/time-division duplex channel (called Time Division Duplexing) is illustrated in FIG. 2. Since each slot (k, k+1, k+2, . . . is on a different frequency, the channel is actually a Frequency Hop/Time Division Duplex (FH/TDD) channel. Let us define the transmission by the master as being on a forward link and the transmission from the slave being on a reverse link. Note that by alternatively transmitting and receiving, only half of the capacity is allocated to the forward link and the other half is allocated to the reverse link. Each packet contains a preamble (access code) 201, a header 203, and possibly a payload 205. One exemplary packet is illustrated in greater detail in FIG. 3. The preamble 201 contains a unique binary code identifying the piconet. The header 203 contains control information for flow control and error control. In addition, it contains a 3-bit slave address. This slave address is used by the master to direct a particular packet to a particular slave. All slaves receive the packets sent by the master on the forward link; however, only the slave indicated by the slave address in the packet header 203 will accept this packet and process the payload 205. The slave address also automatically indicates which slave is allowed to respond to the master in the next slave-to-master slot. Thus, even if no payload is attached, the packet sent by the master in the master-to-slave slot implicitly polls the slave that is allowed to send in the slave-to-master slot just following.

Figure 4:
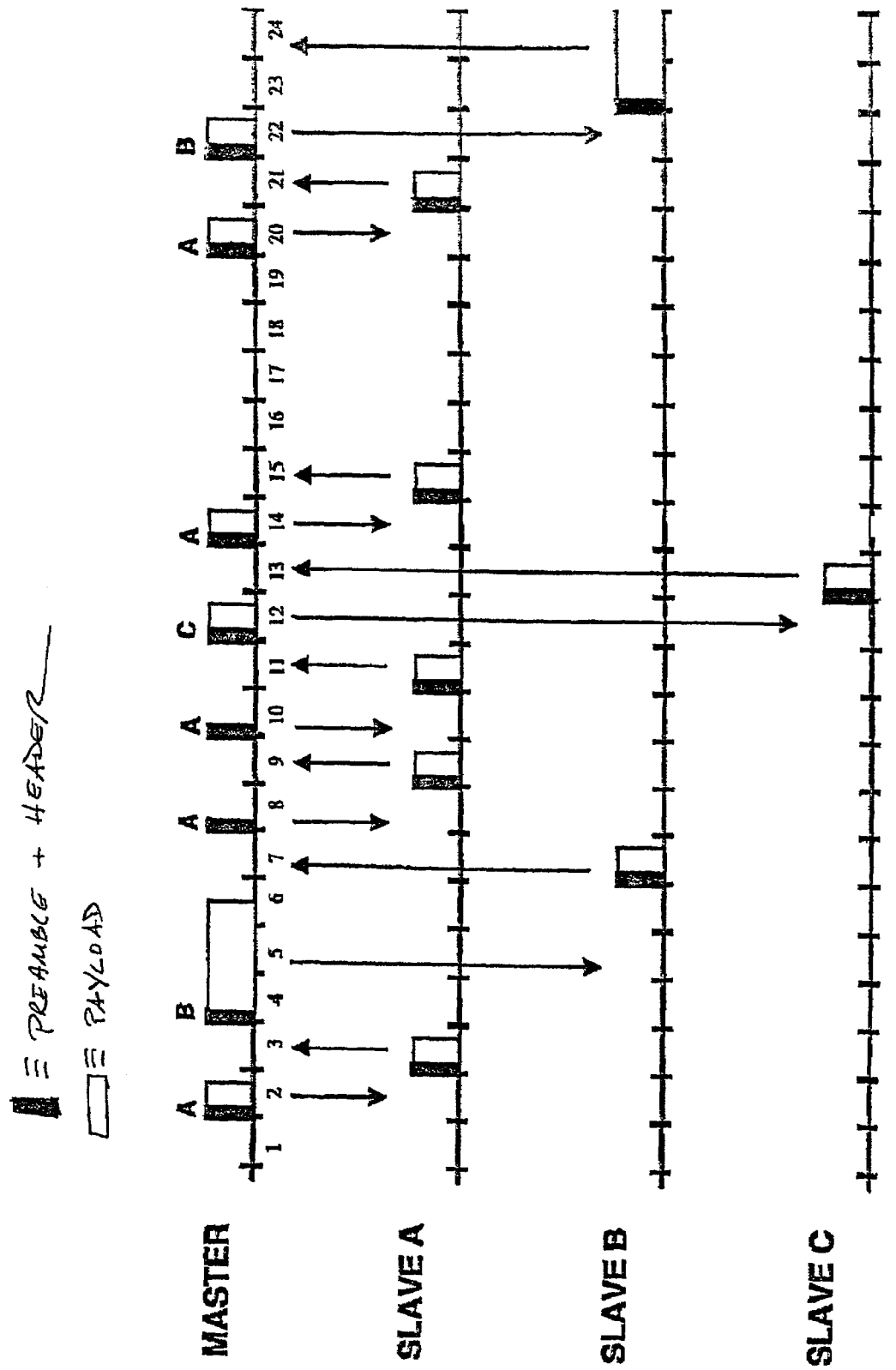
FIG. 4 is a timing diagram showing a typical polling strategy as implemented in a BLUETOOTH™ system.

An example of this polling is shown in FIG. 4, in which a master communicates with three slaves (A, B and C). The master has complete control over which slave is being polled, and therefore has complete control over which slave can send information because a slave cannot transmit unless it is polled in the preceding slot. If the master has no information to send to the slave, it is preferable for the master still to occasionally poll the slave for the purpose of finding out whether the slave has information to send. In these instances, the master will send a packet having a preamble 201 and a header 203 containing the slave address, but not having a payload 205. In FIG. 4, this is the case in slots 8 and 10 where the master has nothing to send to slave A but still (implicitly) polls it. Polling and scheduling are considered the same in this context, and refer to the procedure in which the master addresses the slave for communications (either from master to slave, or from slave to master, or for both).

The procedure for scheduling polling of the slaves should to take into account the following issues:
  desired nominal throughput from master to slave and vice versa;
  slave latency requirement (e.g., the maximum delay between an event and the poll); and
  priority of services at master and slave (e.g., voice traffic above best-effort file transfer).

Figure 5:
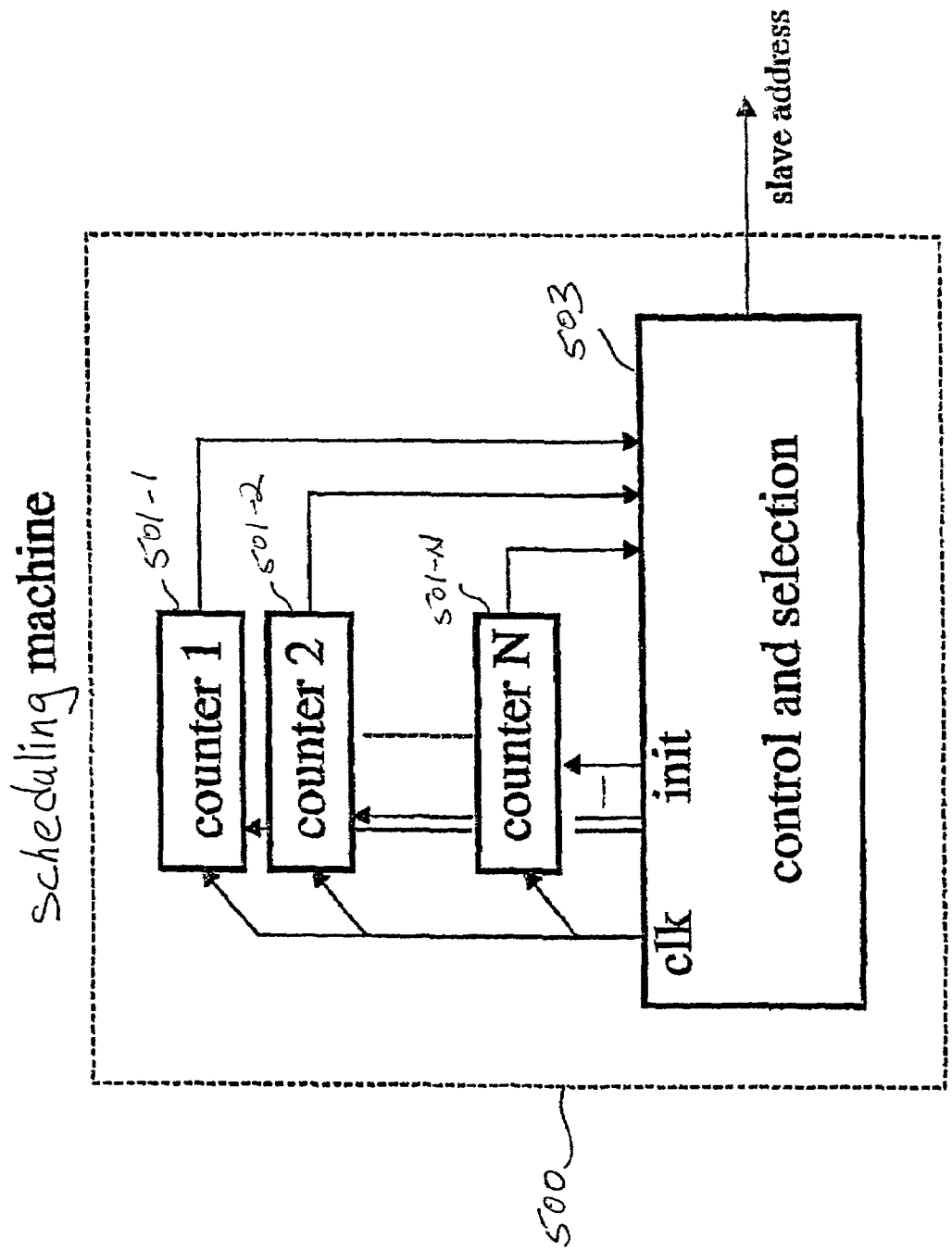
FIG. 5 is a block diagram of an exemplary embodiment of a polling machine according to an aspect of the invention.

The scheduling procedure described herein is solely determined by the setting of the polling intervals to the different slaves. An exemplary scheduling machine 500 (also called "scheduler"), residing in the master, is shown in FIG. 5. The scheduling machine 500 has N counters 501-1, . . . , 501-N (generally referred to herein with the reference number "501-$x$") where N is the number of active slaves that can be supported. (The maximum number for N is 7 in the current BLUETOOTH™ standard.) At any given time, there is a number, kmax, that represents the number of slaves that are actually active. It follows that kmax$\leq$N. The counters 501-$x$ are preferably numbered to indicate their relative priority with respect to one another. For example, the counters may be numbered consecutively, like 1, 2, . . . , N where for example the counter with the lowest number has the highest priority. Under this strategy, counter 1 is associated with the slave having the highest priority, counter 2 is associated with the slave with the second-highest priority, and so on. The counters are initialized with certain begin values, T, as will be discussed later. While it is not essential to practicing the invention, each begin value, T, is preferably an even integer number and represents the time interval in slots of 625 $\mu$s between consecutive polls. Since the master can only poll in a master-to-slave slot, which in this embodiment arrives every two slots, the time interval between consecutive polls will be even. Requiring T to be an even number is a convenient way to ensure this. For each slot, the values stored in the counters 501-$x$ are adjusted, for example by decrementing. The amount of the adjustment in this embodiment is 1, but in some embodiments in which a poll event involves using more than one time slot, the counter values are adjusted by an amount that corresponds to the number of elapsed time slots since a last adjustment of all of the counters 501-$x$. The master will poll a highest-priority slave whose counter contents have reached zero (or whose contents have a negative value—see discussion below). If, in any given time slot, multiple counters 501-$x$ have a zero or negative level simultaneously, the slave associated with the counter 501-$x$ with the lowest number (i.e., the highest priority counter 501-$x$) is polled. The counter 501-$x$ whose slave is polled is reset by adding the corresponding polling interval to the contents of the counter (in case the counter value is zero, the contents becomes the polling interval). The counters 501-$x$ that have reached or gone below the zero level but are not reset (since a higher priority slave was polled) are not affected. At the next slot, all counters 501-$x$ are decremented again. Counters 501-$x$ with a zero level will now contain a negative value and counters 501-$x$ with an already negative value will now contain an even lower value. Again, the lowest-numbered (i.e., highest priority) counter 501-$x$ whose contents are zero or negative determines which slave is polled. When this counter 501-$x$ is reset, the polling interval (i.e., the begin value) is added to its current counter value. As a result, delays caused by higher priority services are automatically compensated for.

Figure 6:
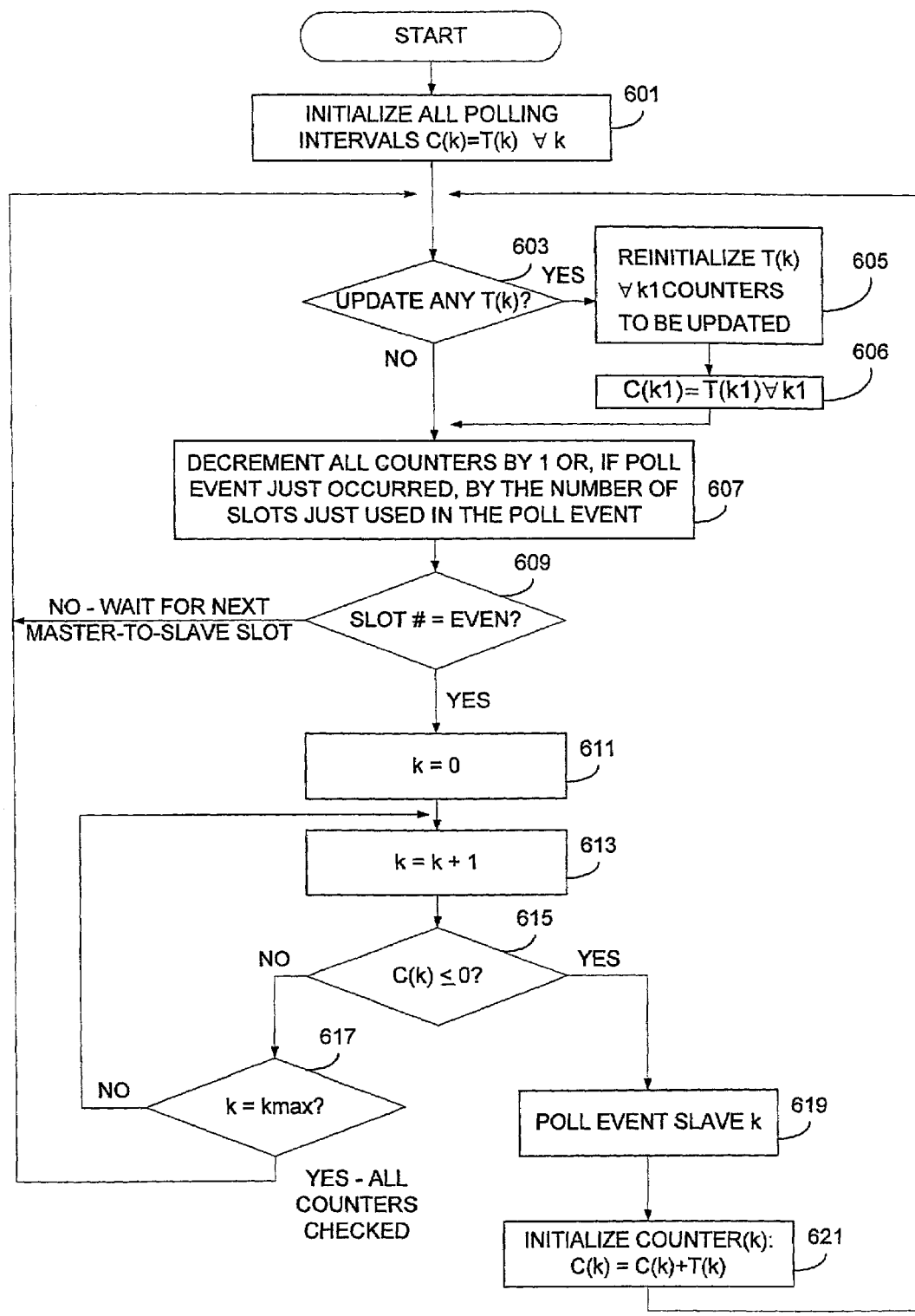
FIG. 6 is a flow diagram of a polling scheme according to an aspect of the invention.

One of a number of possible embodiments of the polling procedure as described above is illustrated by the flow diagram shown in FIG. 6. This procedure may be carried out by the control and selection unit ("controller") 503 depicted in FIG. 5. An overview of the procedure is as follows, where C(k) represents the contents of counter 501-$k$; and T(k) represents a polling interval associated with counter 501-$k$: The controller 503 in the scheduling machine 500 checks the counters 510-$x$ that have been assigned to slaves (i.e., counters 501-1 through 501-kmax), lowest-numbered counters first. If a counter 501-$k$ is identified as having contents that are zero or negative, its associated slave (denoted "S(k)") is polled. Based on the result of the polling, the polling interval T(k) may be adjusted. Thereafter, the counter contents C(k) are adjusted by adding the polling interval T(k) to the counter contents to result in C(k)=C(k)+T(k). Next, all counters are decremented and the entire procedure starts from the beginning.

Adjusting the polling interval T(k) effectively changes both the latency interval and the allocated bandwidth: as the interval T(k) is reduced, the allocated bandwidth is increased and the latency is reduced. The allocated bandwidth or throughput for slave k corresponds to 2/T(k), i.e., 1/T(k) in the forward link and 1/T(k) in the reverse link. The allocation in forward and reverse directions is identical since, in this embodiment, for each master-to-slave slot there is a slave-to-master slot. Since the total capacity of the channel is constant, changing the T(k) for one slave may have an affect on the latency and throughput of the other slaves. The master can change the polling interval between Tmin and Tmax where Tmin is determined by the throughput requirements (the smallest polling interval gives the higher throughput) and Tmax is determined by the latency (how long a slave has to wait until the master gives him an opportunity to transmit).

The polling procedure depicted in FIG. 6 will now be described in greater detail. At first, all counter contents, C(k) (1$\leq$k$\leq$kmax), are set equal to their corresponding polling intervals T(k) (step 601). After this initialization, a polling cycle begins by determining whether the polling interval, T(k), needs to be changed for any of the counters 501-$x$ (decision block 603). This is unlikely to happen, the first time through the loop. However, as explained above, it may be desirable to dynamically adjust the polling interval, T(k), based on the result of a polling operation. Thus, if one or more polling intervals should be changed, ("YES" path out of decision block 603), then the polling interval, T(k1), is reinitialized for all k1 counters to be updated (step 605), and the counters contents C(k1) of these k1 counters are set equal to the new polling intervals (step 606).

Regardless of whether the polling interval, T(k), has been reinitialized, all counter contents, C(k), are then adjusted (e.g., decremented) by an amount that corresponds to the number of time slots that have elapsed since a previous adjustment (step 607). For example, if no poll event occurred, only one time slot will have elapsed since the last adjustment, and the adjustment amount will therefore be equal to 1.

Having no poll event occur in a polling cycle can occur in either of two ways. First, the polling cycle may be occurring in a time slot intended only for slave-to-master communication, for example in an odd-numbered time slot ("NO" path out of decision block 609). In such cases, no poll event is possible.

Another way that it may be possible for no poll event to occur in a polling cycle is for none of the counter values, C(k), to have reached or passed the zero mark. This means that none of the slaves has had even its minimum polling interval elapse since it was last polled. In the exemplary embodiment, this is discovered by starting with the lowest-valued counter (steps 611, 613) and checking each counter value, C(k), from highest to lowest priority, and determining that none of the counter values, C(k), has reached or passed the zero mark (e.g., is less than or equal to zero) ("NO" path out of decision block 615 and "NO" path out of decision block 617). After all counters have been checked ("YES" path out of decision block 617), each counter value would then be adjusted by a value of 1 (step 607) and the polling cycle repeats.

If, during the polling cycle, one of the counter values, C(k), is determined to have reached or passed the zero mark ("YES" path out of decision block 615), then the corresponding slave, k, will be polled (step 619). Following this poll event, the counter value, C(k), for this slave is reinitialized by adding its polling interval, T(k), to the present counter value, C(k) (step 621). The polling cycle then repeats, at step 603. Since a poll event just occurred, there is the possibility that more than one time slot has elapsed without the counter values having been adjusted. Consequently, in this case the amount by which all of the counters 501-$x$ are adjusted in step 607 is equal to the number of slots that were used in the just-executed poll event.

An example will now illustrate the procedure. FIG. 7 shows an example with three slaves A, B, and C with decreasing priority. Slave A is associated with counter 1, slave B with counter 2, and slave C with counter 3. The throughput and latency requirements in this example are specified as follows:

For slave A, Tmin=12 and Tmax=18;
For slave B, Tmin=8 and Tmax=12; and
For slave C, Tmin=6 and Tmax=12.

What this means is that slave A desires $\frac{1}{12}$ of the channel capacity (i.e., $\frac{1}{12}$ of the total capacity for the reverse link), and wants a guaranteed latency of 18 slots; slave B desires $\frac{1}{8}$ of the channel capacity and a guaranteed latency of 12 slots; finally, slave C desires $\frac{1}{6}$ of the channel capacity and a guaranteed latency of 12 slots. The initial T(k) values are based on the Tmin(k) values. It will be observed that, even though slave C wants the highest amount of channel capacity, and slave B wants the next highest, their counter assignments will give slave A the highest priority and slave B the next highest priority in the event that two or more slaves want to be polled in the same time slot.

It is assumed that the buffers in the slaves are full. The contents, C(x), of the counters 501-$x$ and the polling behavior is shown in FIG. 7. Each line represents a slot, with successively occurring slots being depicted vertically from top to bottom. During the first slots, the counters are all positive and no polling takes place. At slot 6, counter 3 has reached the zero status. This counter is associated with slave C which is therefore polled by the master in slot 6 (denoted in the figure as "TX to C"). In slot 7, slave C may send something back to the master (denoted in the figure as "RX from C"). At slot 8, counter 2 reaches zero and slave B is polled. This means that, in the next slot (i.e., slot 9), the master may receive a packet from slave B. At slot 12, both counters 1 and 3 have reached the zero status. Since counter 1 has higher priority, slave A will be polled at slot 12. Then, counter 1 is updated, that is, its contents are reset to Tmin(1)=0+12=12. At slot 14, the master will poll slave C because the contents of its associated counter, namely counter 3, have become negative. At slot 16, it is slave B's turn. At slot 18, counter 3 has reached the zero status and slave C is polled again. Polling in the remaining slots is performed in accordance with the same procedure, and is as depicted in the remainder of the figure.

Note that the latency requirements are all fulfilled since the polling interval is less than or equal to the maximum latency requirements specified above (T(k)$\leq$Tmax(k) for all k). For the example in FIG. 7, the forward and reverse bandwidth allocations between slaves A, B, and C are $\frac{1}{12}$, $\frac{1}{8}$ and $\frac{1}{6}$ (forward and return links are symmetric), respectively. The requested aggregate capacity amounts to: $\frac{2}{12}+\frac{2}{8}+\frac{2}{6}<1$ and fits within the channel capacity. Examining the list in FIG. 7, it will be noticed that the average reverse link throughput of the slaves becomes $\frac{1}{12}$, $\frac{1}{8}$ and $\frac{1}{6}$, just as requested by the slaves. Furthermore, there is still capacity left which is represented by the open slots where no polling events are scheduled.

It is also possible for the slaves' requested capacity to exceed the actual channel capacity. For example, in FIG. 8, a situation is shown in which Tmax(1)=4, Tmax(2)=8 and Tmax(3)=6. The requested aggregate capacity in this case exceeds the channel capacity: $\frac{2}{4}+\frac{2}{8}+\frac{2}{6}>1$. In this case, it will be seen that the slave with the lowest priority is automatically cut on its throughput request.

Slave A has the highest priority, and is therefore assigned the counter associated with the lowest number (i.e., counter 501-1). Therefore, its throughput request is always honored. Slave B is next in line, and is therefore assigned to counter 501-2. Its throughput request does not exceed the remaining capacity, and it therefore receives the $\frac{1}{8}$ throughput. Now only $\frac{1}{4}$ of the channel capacity is left. Slave C, which is assigned to counter 501-3, cannot receive more than this. When it requests more, it will only receive what is left. So, as can be seen in FIG. 8, slave C only receives $\frac{1}{4}$ of the channel capacity equally divided over forward and reverse links (on average, it is polled every 8 slots). The channel capacity is completely exploited which is illustrated by the lack of open slots. The counter contents associated with slave C slowly decrease and become negative constantly (not shown are methods to prevent the counter associated with slave C from underflowing due to its limited size; for example it is possible to count modulo T(k), taking into account that negative contents always remain negative and positive contents always remain positive even after the modulo correction). It can be shown that if a fourth slave had been added, it would not have received any bandwidth since no capacity was left. The priority concept that makes up part of the scheduling machine 500 thus operates to dynamically allocate bandwidth such that higher priority slaves receive the requested bandwidth.

It will be recalled that in the above examples, it was assumed that each slave's buffer was full. If the buffer at one or more slaves is emptied, the polling interval T(k) can be increased again from Tmin to Tmax. This can be done gradually or abruptly. In one possible embodiment, the polling interval T(k) is increased and decreased exponentially depending on the traffic conditions in the uplink and the downlink. For example if there is no data available, T(k) is multiplied by a factor a each time α poll event has passed without data transfer until Tmax(k) has been reached. In contrast, for each poll event to slave k with data transfer, the interval T(k) is divided by β until Tmin(k) has been reached. If T(k) of one of the slaves k increases, the total amount of system capacity that is utilized decreases and any capacity coming available is automatically allocated to the slave with the highest priority which did not get its requested throughput. This is shown in FIG. 8 at slot 32. At this time, it is assumed that slave A has nothing to send anymore. The master may then decide to allocate less bandwidth to slave A and change the polling interval from 4 back to 12. As a result, capacity becomes available which, over time, is automatically allocated to slave C who will now receive its requested bandwidth. That is, slave B continues to receive the same amount of system capacity, and the capacity made available by the change in slave A's polling interval is automatically allocated to slave C, since slave C had been receiving fewer time slots than requested. The allocation returns to the situation depicted in FIG. 7.

Here is a simple analogy. Suppose each slave is represented by a bucket, with the size of the bucket corresponding to the requested capacity. The buckets are arranged in a row with the higher priority slaves on the left. Suppose further that there is a fixed amount of water in a storage container: this represents the total system capacity. The left-most bucket is filled first from the storage container. The water contents of the bucket represent the utilized capacity by that slave. If the first bucket is full, the storage container is then moved so that it can fill the next bucket to the right. This process continues. If there comes a point at which there are no more buckets left to fill (all buckets are full) but there is still water in the storage container, then there is still capacity left on the channel that is not utilized. If however, the storage container runs out of water before arriving at the right-most bucket, then the requested capacity (number and size of buckets) is bigger than the system capacity (total amount of water in the storage container). If the result is that buckets get only partly filled, it means that they requested more capacity (size of bucket) than there is water available.

Now observe what happens if one of the bucket sizes is increased or decreased. If one increases the size of a bucket K that has a (partly) filled bucket L on the right, then water will be transferred from bucket L to bucket K, in order to fill up bucket K. But now that bucket L is emptied, it will try to get water from its neighbor to the right (bucket M), if available. So, higher priority slaves can steal capacity from lower priority slaves as long as there is capacity available at these lower-priority slaves.

If a higher priority slave now reduces its requested capacity, its bucket size reduces. The amount of water becoming redundant is spilled over to the bucket to the right. If this bucket is full as well, it will transfer the water over to its neighbor to the right, and so on. This transferring of capacity is all performed automatically, and operates over longer time intervals (in the order of the polling intervals).

Figure 9:
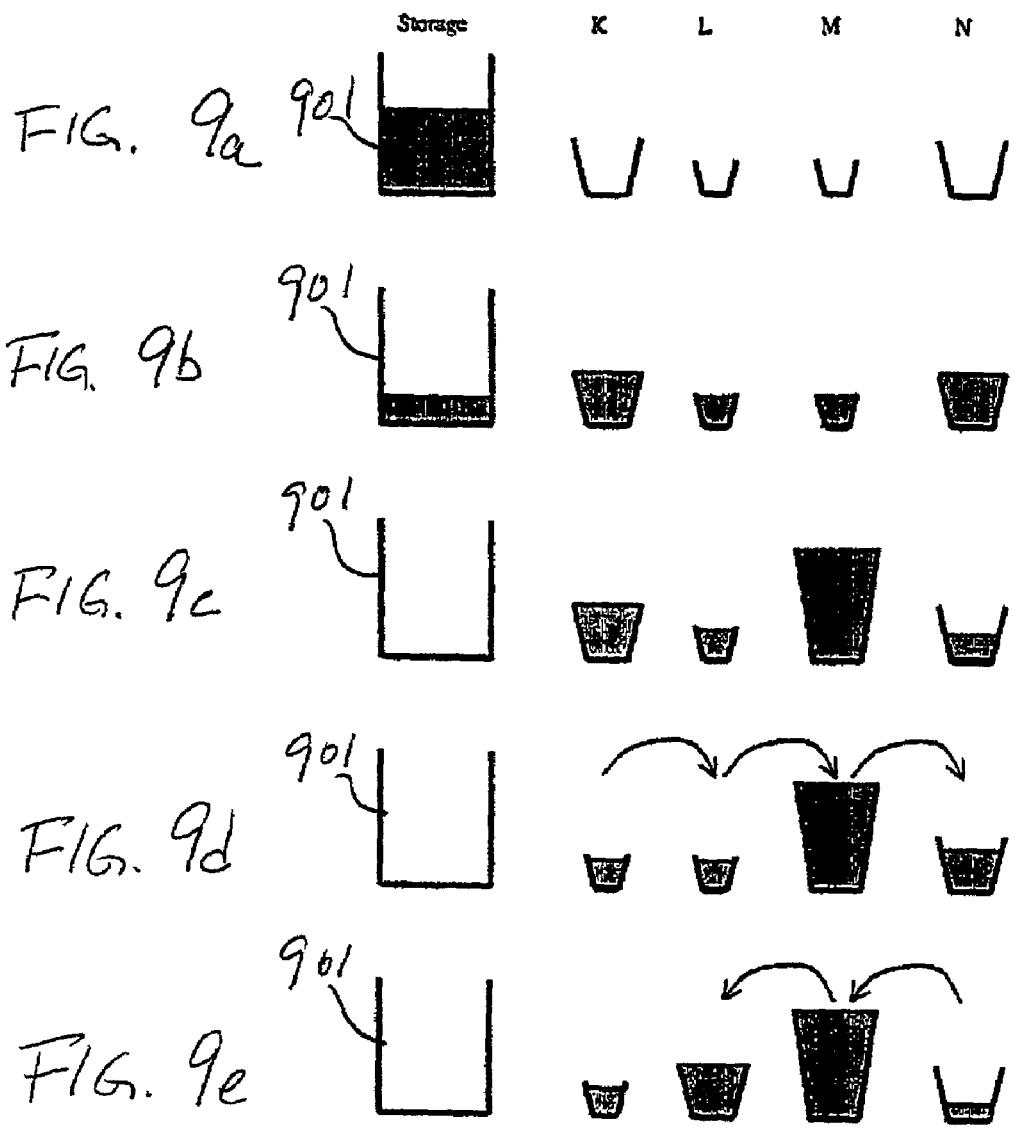
FIGS. 9a through 9e illustrate, by way of analogy, how changing the polling interval affects the utilization of system resources, according to the invention.

This analogy is illustrated in FIGS. 9a through 9e. In FIG. 9a, the water in the storage container 901 represents the total system capacity. The buckets K, L, M and N represent the slaves, the bucket sizes their requested capacity, and their ordering their relative priority, the highest priority being on the left and the lowest priority being on the right. In FIG. 9b, the water from the storage container 901 has been distributed among the buckets, with the left-most buckets getting water first. In this case, the requested capacity is smaller than the system capacity, and there is still water left in the storage container 901.

In FIG. 9c, an increase in bucket (slave) M's requested capacity results in the total requested capacity being larger than the available capacity. Water has flowed from left to right, emptying the storage container 901 in an attempt to fill bucket M. Bucket M remained unfilled, however, so some of the water flowed right to left, from bucket N to bucket M, until bucket M was filled. This leaves bucket N only partially filled, with no additional water (system capacity) available to top it off. As a result, the utilization of slave N is smaller than requested.

Now, as shown in FIG. 9d, slave K has reduced its capacity request (illustrated by the smaller bucket K in FIG. 9b). This makes water (i.e., system capacity) available for distribution to the right. It spills to bucket L, but since this bucket is full, it spills to bucket M. Since this bucket is full as well, the water spills into bucket N. Thus, slave K's reduction in requirements has resulted in an increase in the utilization of slave N.

In FIG. 9e, slave L has increased its request for capacity, as illustrated by the larger bucket L. Bucket L cannot steal water from bucket K because bucket K has higher priority. Instead, bucket L steals water from bucket M until it is full. Bucket M, in turn, steals water from bucket N either until bucket M is full, or until bucket N runs out of water.

It will be understood that by controlling the T values, the master can both reduce or increase the bandwidth allocated to the slaves, even if they have different priorities. If a low-priority slave is getting too little bandwidth, the master can either increase the slave's priority (by assigning a lower-numbered counter to this slave in the polling machine) or alternatively reduce the bandwidth of higher-priority slaves. (Of course, the master could also do both.) As bandwidth becomes available from higher-priority slaves, it is automatically allocated to lower-priority slaves whose bandwidth requirements have not yet been fulfilled. This means that the master simply does not use Tmin for the higher-priority slaves but some number between Tmax and Tmin. By varying the T values between Tmax and Tmin, the master has all the flexibility to distribute the channel bandwidth among the slaves and can accommodate any change in traffic conditions.

Figure 10:
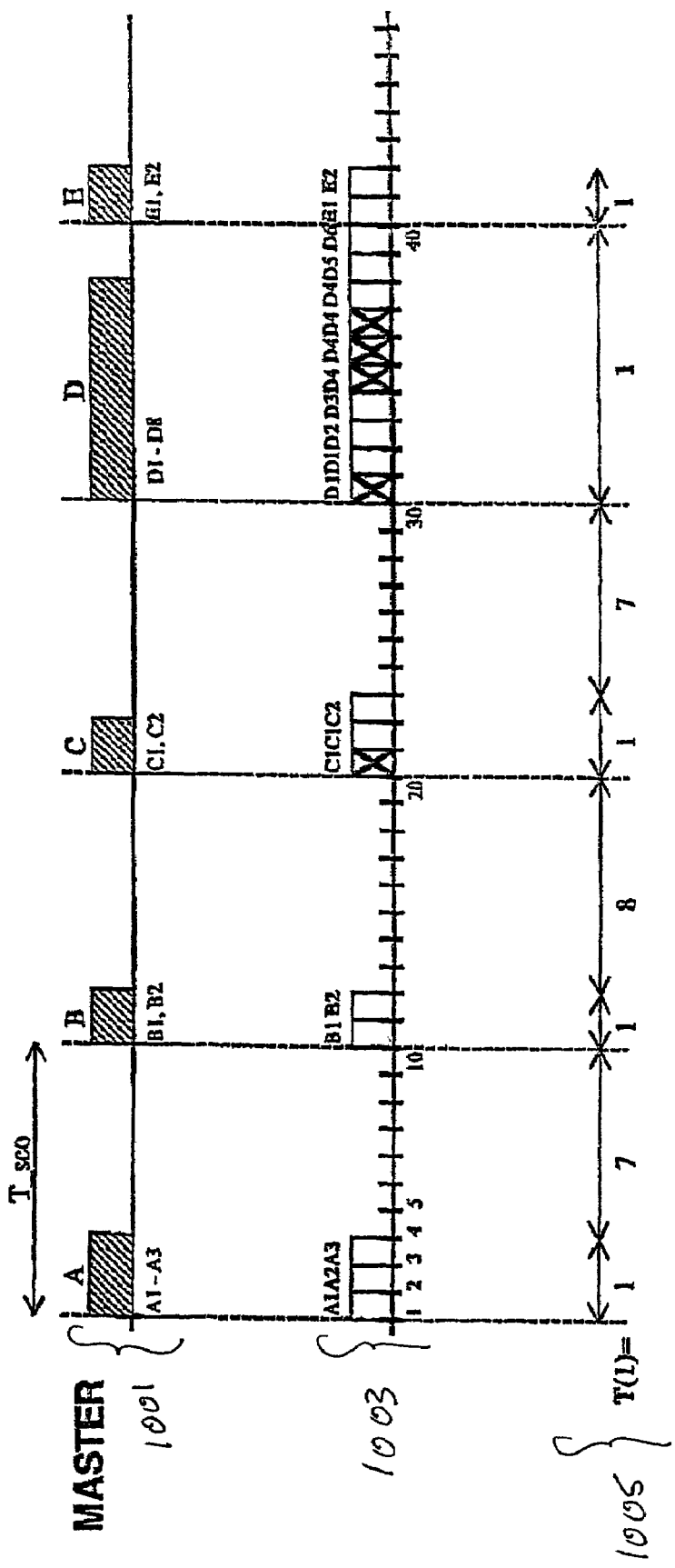
FIG. 10 is an exemplary timing diagram showing operation of the polling scheme for the case of isochronous traffic, in accordance with an aspect of the invention.

Dynamically changing T(k) between Tmax and Tmin is also attractive for isochronous services. In isochronous services, messages arrive at the sender with a fixed interval. The message has a lifetime only covering the isochronous interval T_iso. If the message (or part of it) has not been transmitted successfully during the corresponding interval T_iso, the message is discarded and the next message is taken. The instantaneous bandwidth requirement depends on the size of the message and the error conditions on the link. If packet transmissions fail, retransmissions are required which requires more bandwidth. For the isochronous case, the sender could vary T(k) between T(k)=Tmin, when the interval has started, and T(k)=Tmax when the message has been sent successfully. An example of this operation is given in FIG. 10, which depicts the communication between the master and slave 1. Only the traffic flow from master to slave is considered in this example. This traffic flow is isochronous with an isochronous interval T_iso=10. It is assumed that slave 1 has the highest priority. In a first time line 1001, the offered load is shown (the arriving messages A, B, C, and so on). Messages arrive with a fixed interval (T_iso) but differ in size. Each message is fragmented into air packets (i.e., A1, A2, and A3) that fit into the slots. If a transmission on a certain slot fails, retransmission has to be carried out in the next slot. However, if the lifetime of a packet expires, it is discarded and the first packet of the next message is sent instead. In a second time line 1003, the air packets and the failures (depicted in the figure by crosses) are shown. If a packet fails, it is retransmitted in the next slot. In the example, packets A1, A2, A3, B1 and B2 are transmitted without error, and are therefore each transmitted only once. By contrast, the initial transmission of packet C1 fails. Consequently, packet C1 is retransmitted, this time successfully. The transmission of packet C2 is successful the first time, so no further transmissions are required. It can be seen that the total transmission of message C, which comprises two packets (C1 and C2) required three time slots. This is less than the fixed interval T_iso; thus, the entire message C is transmitted and received successfully.

In this example, message D is very large (eight packets worth of data), and many errors occur during its transmission. For example, the packet D1 requires two time slots (one for initial transmission and one for retransmission) and D4 requires four time slots to accomplish its successful transmission. By the time packet D4 is successfully transmitted, only two time slots remain within the fixed interval T_iso, but there are four of message D's packets remaining to be transmitted (i.e., packets D5, D6, D7 and D8). Therefore, there is no time to transmit the entire message successfully even if no more failed transmissions occur. At slot 40, packet D6 is transmitted, but the lifetime of all packets expires at slot 41. As a result, packets D7 and D8 are discarded and message E is transmitted.

It can be seen from the third time line 1005, that the master dynamically changes the polling interval T(1) of slave 1. At the beginning of each interval, the value is reduced to 1 so that the buffer with data for slave 1 is emptied (remember that in this example, slave 1 priority is highest, so this transmission will not be interrupted by reallocation of the downlink to another slave). When no data is present any more during the fixed isochronous interval T_iso, the T value is increased in such a way that the slave will be addressed again at the beginning of the next isochronous interval. For example, when packet A3 has been sent successfully, T(1) increases to 7 so that this slave will not use system capacity until slot 11, the first slot of the next isochronous interval. (During this interval, capacity may be allocated to other slaves.) As long as the buffer is not empty, the master uses T=Tmin. If the buffer is empty, it calculates the time until the next message will arrive and adjusts T accordingly. It can be seen here that there is a dynamic trade-off between bandwidth and latency. At the beginning of the isochronous interval, T is minimized in order to maximize bandwidth (and to start to transfer the message as quickly as possible). When the message has successfully been transferred, the bandwidth is minimized by increasing T, but it is not set any larger than the amount needed to guarantee the latency requirements (i.e., the start of the next isochronous window).

The master-to-slave and slave-to-master bandwidth allocations can also be combined rather easily. The polling scheme as defined in a BLUETOOTH™ system always combines a master-to-slave slot with a slave-to-master slot. In the most simple situation discussed so far, the forward and reverse links apply packets which fit in a single slot. In that case, the forward and reverse links obtain the same throughput. The master preferably allocates a polling interval T(k) such that the requirements for both forward and reverse link will be fulfilled. In the case of the forward link, the required polling interval, denoted TF, is between TFmax and TFmin, whereas for the reverse link, the required polling interval, denoted TR, is between TRmax and TRmin. In this case, the following procedure could be carried out to set a suitable polling interval:

if forward link has data waiting but reverse link does not: T=min(TFmin,TRmax)

if reverse link has data waiting but forward link not: T=min(TFmax,TRmin)

if both forward and reverse link have data waiting: T=min(TFmin,TRmin)

if neither forward or return link have data waiting: T=min(TFmax,TRmax)

Again, the allocated polling interval, T, can be dynamically adjusted depending on traffic conditions.

In the BLUETOOTH™ standard, the master can allocate bandwidth both by controlling the polling interval and also by allocating certain packet types. That is, on the BLUETOOTH™ air interface, the transmitter can choose between single slot packets, 3-slot packets or 5-slot packets. Longer packets result in a lower overhead represented by the preamble and the header. Longer packets therefore result in higher throughput. The polling interval together with the applied packet type determines the allocated bandwidth. To determine the bandwidth allocation, forward and reverse link cannot be considered combined any more as was done in the earlier-described embodiments in which a single forward slot was always combined with a single reverse slot. In the more complex situation, a single-slot packet in the forward link may be followed by a 3-slot packet in the reverse link; or a 5-slot packet in the forward link may be followed by a single-slot packet in the reverse link. With a polling interval for slave k of T(k), a forward packet type of PF(k) (PF(k)=1, 3, 5) and a reverse packet type of PR(k) (PR(k)=1, 3, 5), the bandwidth allocation becomes PF(k)/T(k) in the forward link and PR(k)/T(k) in the return link. The total capacity taken by a star network with N slaves becomes:

$$C = \sum_{k=1}^{N} \frac{PR(k) + PF(k)}{T(k)} \leq 1 \qquad (1)$$

The total capacity must be less than or equal to 1. When creating the polling procedure, the master first determines the priorities between the slaves. Note that each priority assignment applies to a certain slave and does not distinguish between uplink and downlink. This means that a slave that has a high priority in the forward link will also have a high priority in the reverse link. The master first starts with the highest priority slave k=1 and honors the bandwidth request taking into account the priority interval, T(1), based not only on TFmax(1), TRmax(1),TFmin(1), TRmin(1), but also on PF(1) and PR(1). Then the master considers the parameters for the slave with the second-highest priority. The total aggregate capacity must not exceed 1 as is indicated in equation 1 (where Eq. 1 is calculated for k=1, 2). For additional slaves, the procedure is repeated. If there is not sufficient capacity left to accommodate both the forward and reverse bandwidth requests (i.e., PF(k)/T(k)+PR(k)/T(k) is larger than the capacity which is remaining), the master may adjust any of the values T(k), PF(k) and/or PR(k) to at least ensure a sufficient balance between the forward and reverse links to slave k. After setting the T(k) values, the scheduling machine 500 operates as before. The master only has to take into account that multi-slot packets can be sent and received. A transmission of a multi-slot packet cannot be interrupted.

An example of this embodiment is shown in FIG. 11. In this case, PF(1)=3, PR(1)=1, PF(2)=1, PR(2)=1, PF(3)=1, PR(3)=5. With T(1)=12, for slave A, (3+1)/12=⅓ of the channel capacity is used with an imbalance of 3:1 between forward and return link. With T(2)=6, for slave B, a symmetric link with ⅓ of the channel capacity is reserved. Finally, with T(3)=18, for slave C, ⅓ of the channel capacity is again used with an imbalance of 1:5. The aggregate capacity request is 1, so no channel capacity is left to be allocated to others. Note that once a polling event has started (defining the polling event as the entire transmission from the master to the slave and the entire transmission from the slave to the master) it cannot be interrupted by polling a higher-priority slave. The started polling event has to be finalized first before a new polling event can be started. This is shown in FIG. 11 at slot 24. At that slot, the counter 501-2 associated with slave B has become zero. Yet, the 5-slot transmission by slave C has not finished. It is only after slave C's transmission is first finished that a next new polling event occurs, in this case at slot 26. At slot 26, the scheduling machine 500 considers all counters 501-$x$ and then decides to poll slave B. A similar example occurs at slots 38 and 40, in which the counters associated with slaves B and A become zero, respectively, while slave C is still transmitting its 5-slot packet. In this case, slave A has to wait until slot 42, and slave B has to wait even longer until slot 46 before being allocated a time slot.

The discussion thus far has treated asynchronous (best-effort) and isochronous traffic applications. In still other embodiments, the invention can be applied to synchronous traffic as well. Synchronous traffic always has the highest priority. In BLUETOOTH™ systems, synchronous traffic is provided by reservation of slots (pairs) at a constant interval. This technique is called a Synchronous Connection Oriented (SCO) link, whereas asynchronous and isochronous traffic are communicated on what are called Asynchronous ConnectionLess (ACL) links. The SCO link uses reserved slots, and the ACL links use all remaining slots. Since SCO is a static concept that is initialized once, the BLUETOOTH™ scheduler can be limited to operation on the ACL link. However, there are a number of alternatives that enable the merging of the SCO concept with the scheduler described herein as well.

A first of these alternative embodiments is called SCO prioritization. In accordance with this strategy, the scheduler first checks whether the coming slots are SCO slots. If so, there will be no polling, but the scheduler operates as normal (e.g., it adjusts counter values). During SCO slots, counters 501-$x$ whose contents have become zero or negative are ignored; the polling can only be performed after the SCO slots.

Another alternative embodiment is called SCO slot skipping. This strategy is similar to SCO prioritization, but here the scheduler simply skips the slots that are reserved for the SCO link. Consequently, the counters 501-$x$ are only adjusted (e.g., decremented) on "valid" slots, that is, slots not occupied by the SCO link. When there is an SCO slot (pair), the scheduler is suspended for the duration of the SCO transaction. The number of SCO links (and therefore the number of skipped slots) should be taken into account when calculating the polling interval, T(k).

Figure 12:
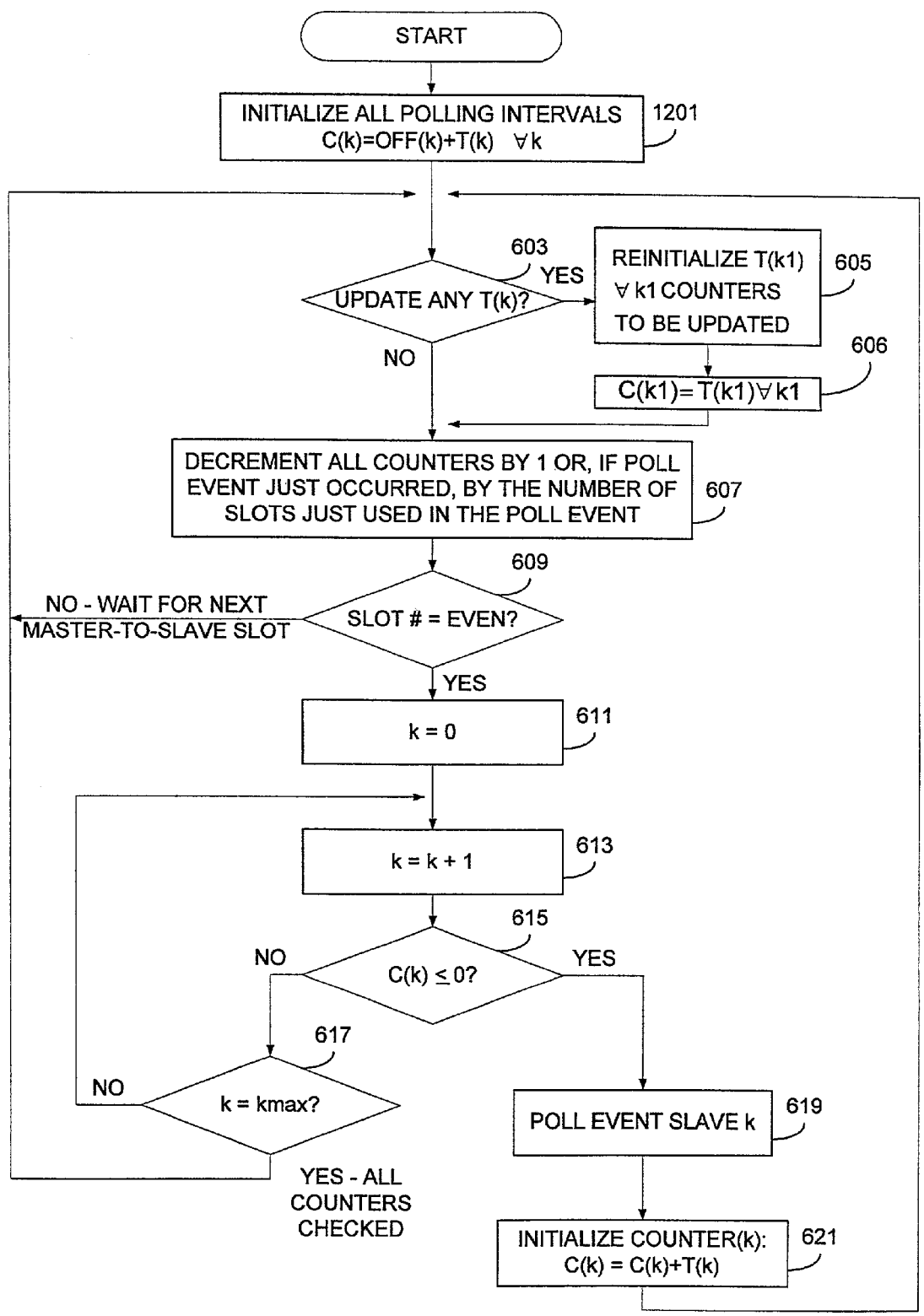
FIG. 12 is a flow diagram of a polling scheme according to an aspect of the invention.

Yet another alternative embodiment is called SCO inclusion. This is the most advanced of these strategies, in which the SCO slaves are included in the scheduler as described in the invention. The SCO slaves are assigned the highest priority. The polling interval, T(k), corresponds to the SCO interval. Since the SCO slaves have the highest priority, the reservation of SCO slots is guaranteed. To allow for multiple SCO links, the links are staggered in time. This requires the SCO intervals to be integer multiples of each other. The most common situation in BLUETOOTH™ systems is to have two SCO links each with an SCO interval of 6 slots (using so-called HV3 packets). In the scheduler according to the invention, the two SCO slaves are given priority 1 and 2. To guarantee slot reservation for multiple SCO links, the staggering should be implemented in the scheduler as well. This is achieved by applying an initial offset, OFF(k), to the counters. When the scheduler activates a counter 501-$x$, it loads its contents with OFF(k)+T(k). This is only done once at initialization. After that, the counter 501-$x$ is only reset to C(k)+T(k) every time the counter reaches zero or becomes negative. Note that OFF(k) is a parameter used once, whereas T(k) is a parameter used repetitively. This is illustrated in FIG. 12, which is a flow diagram of a polling scheme according to an aspect of the invention. Most of the steps performed are essentially identical to those described above with respect to FIG. 6, so a complete description will not be repeated. The technique illustrated in FIG. 12 differs from that depicted in FIG. 6 in that, in step 1201, the counters are initialized to the sum of the offset parameter and the polling interval.

FIG. 13 is an example of operation of the polling scheme according to an embodiment of the invention that utilizes SCO inclusion. In this example, at time t=0, the SCO slave 1 is initialized with C(1)=T(1)=6, SCO slave 2 with C(2)=OFF(2)+T(2)=2+6=8, and ACL slave 3 with C(3)=T(3)=8. It should be noted that, after this initialization, C(2) is updated with T(2)=6 in the remainder of the process. This can be seen, for example, in slot 9, where C(2) has gone from a value of 0 to a value of 6−1=5.

In yet another alternative embodiment, it can be seen that the staggering also works when no offset is applied. The difference in this case is that the slave with the highest-priority-but-one always becomes negative, as can be seen in FIG. 14. Except for differences in counter values, however, the resultant allocation of time slots to the three slaves is the same as that illustrated in FIG. 13.

The invention has been described with reference to a particular embodiment. However, it will be readily apparent to those skilled in the art that it is possible to embody the invention in specific forms other than those of the preferred embodiment described. This may be done without departing from the spirit of the invention.

For example, the above-described polling procedure has been optimized for the BLUETOOTH™ air interface. Of course, the same procedures can be used by other systems applying polling and centrally controlled bandwidth allocation as well. Several methods can be devised to adapt the polling interval T to traffic conditions and other external factors, and those are all covered by the current invention.

In other exemplary alternatives, the scheduling machine 500 need not use dedicated hardware counters, but may instead be implemented by using any equivalent memory alternative, such as assigning count values to particular storage locations in an addressable memory.

Furthermore, the assignment of priority levels to each of the slaves does not have to be fixed, as described above. Instead, these assignments can be designed to change dynamically in order to accommodate changes in various requirements, including changes in slaves' quality of service requirements In still other alternatives, it is possible to permit two or more slaves to be assigned equal priority levels. The exemplary embodiments involving the use of counters can be used for this purpose by periodically switching counter assignments between the two or more slaves that are to be given equal priority. For example, where two slaves A and B are to be given equal priority of service, a first counter can initially be assigned to slave A and a second counter can be assigned to slave B. At this point, the above-described embodiments would give higher priority to slave A. However, after some period of time, the counter assignments are swapped, so that the first counter is assigned to slave B and the second counter is assigned to slave A. At this point, slave B now has higher priority over slave A. The counter assignments are then swapped back and forth periodically. This strategy can be applied to more than two slaves by, for example, using a round-robin approach to the counter reassignment. As a result of this counter-swapping (and hence priority-swapping) strategy, on average the involved slaves will have equal priority, although at any given instant it is possible to identify a slave that has a higher priority than other slaves.

Thus, the above-described embodiments are merely illustrative and should not be considered restrictive in anyway. The scope of the invention is given by the appended claims, rather than the preceding description, and all variations and equivalents which fall within the range of the claims are intended to be embraced therein.

What is claimed is:

1. A method of selecting one of a number, n, of slave devices by a master device in a communication system that transmits during individual ones of a number of sequentially occurring time slots, the method comprising:
   assigning a corresponding priority level to each slave device, wherein at least two slave devices are assigned different corresponding priority levels;
   assigning a corresponding count parameter to each of the slave devices;
   assigning a corresponding initial count value to each of the slave devices;
   for each of the slave devices, initializing the corresponding count parameter to the corresponding initial count value;
   for each successive time slot, adjusting each of the count parameters; and
   selecting a highest priority slave device whose corresponding count parameter has reached or passed a predetermined value.

2. The method of claim 1, wherein adjusting each of the count parameters comprises decrementing each of the count parameters by a predetermined adjustment amount.

3. The method of claim 2, wherein the predetermined adjustment amount is equal to one.

4. The method of claim 1, further comprising:
   explicitly or implicitly polling the selected slave device; and
   adjusting the corresponding count parameter of the selected slave device by an amount equal to the corresponding initial count value.

5. The method of claim 4, further comprising changing the initial count value of at least one slave device sometime after the selected slave has been explicitly or implicitly polled.

6. The method of claim 5, wherein changing the initial count value of at least one slave device after the selected slave has been explicitly or implicitly polled is performed as a function of a status of a buffer of one of the slave devices.

7. The method of claim 5, wherein changing the initial count value of at least one slave device after the selected slave has been explicitly or implicitly polled is performed as a function of a status of a buffer of said master device, wherein said buffer is associated with one of the slave devices.

8. The method of claim 5, wherein changing the initial count value of at least one slave device after the selected slave has been explicitly or implicitly polled comprises changing the initial count value by an amount that results in an exponential change.

9. The method of claim 4, further comprising reassigning the corresponding priority levels of at least two of the slave devices sometime after the selected slave has been explicitly or implicitly polled.

10. The method of claim 4, wherein:
    an isochronous one of the slave devices provides an isochronous service having an isochronous transmission interval; and
    for each message, the initial count value assigned to the isochronous one of the slave devices is adjusted to be a first count value at the start of each isochronous transmission interval, and the initial count value assigned to the isochronous one of the slave devices is changed to a second count value after a last packet associated with said each message is transmitted, wherein the first count value is not equal to the second count value.

11. The method of claim 10, wherein for each message, the second count value is selected such that the second count value ensures that the isochronous one of the slave devices will be explicitly or implicitly polled at the start of a next isochronous transmission interval.

12. The method of claim 1, further comprising:
    determining whether a present slot is a synchronous connection oriented link slot, and if so, then delaying explicitly or implicitly polling the selected slave device until an occurrence of a slot that is not a synchronous connection oriented link slot.

13. The method of claim 12, further comprising:
    suspending the adjusting of each of the count parameters if the present slot is a synchronous connection oriented link slot.

14. The method of claim 1, wherein:
    the n slave devices include one or more synchronous slave devices and one or more non-synchronous slave devices; and
    the corresponding priority levels are assigned to each slave device such that each of the one or more synchronous slave devices has a corresponding priority level that is higher than the corresponding priority level of any one of the one or more non-synchronous slave devices.

15. The method of claim 14, wherein the initial count values of the one or more synchronous slave devices are selected so as to ensure that the time slots utilized by the one or more synchronous slave devices are staggered with respect to one another.

16. The method of claim 15, further comprising:
    after initializing the corresponding count parameter to the corresponding initial count value, adjusting the initial count values of the one or more synchronous slave devices so that they will equal a corresponding synchronous connection oriented link interval.

17. A method of selecting one of a number, n, of slave devices to be explicitly or implicitly polled by a master device in a communication system that transmits during individual ones of a number of sequentially occurring time slots, the method comprising:
- assigning a different corresponding priority level to each of a number, n, of counters;
- assigning a corresponding one of the counters to each of the slave devices;
- assigning a corresponding initial count value to each of the slave devices;
- for each of the slave devices, initializing the corresponding counter to the corresponding initial count value;
- for each successive time slot, adjusting each of the counters;
- identifying a highest priority counter whose contents have reached or passed a predetermined value; and
- selecting for express or implicit polling the slave device corresponding to the identified counter.

18. A method of explicitly or implicitly polling one or more of a number, n, of slave devices by a master device in a communication system that transmits during individual ones of a number of sequentially occurring time slots, the method comprising:
- a) assigning a different corresponding priority level to each of a number, n, of counters;
- b) assigning a corresponding one of the counters to each of the slave devices;
- c) assigning a corresponding initial count value to each of the slave devices;
- d) for each of the slave devices, initializing the corresponding counter to the corresponding initial count value;
- e) periodically adjusting each of the counters by an amount equal to a number of time slots that have occurred since a last adjusting of each of the counters;
- f) identifying a highest priority counter whose contents have reached or passed a predetermined value;
- g) selecting for express or implicit polling the slave device corresponding to the identified counter;
- h) explicitly or implicitly polling the selected slave device;
- i) adjusting the corresponding counter of the selected slave device by an amount equal to the corresponding initial count value; and
- j) repeating steps e) through j).

19. An apparatus for selecting one of a number, n, of slave devices by a master device in a communication system that transmits during individual ones of a number of sequentially occurring time slots, the apparatus comprising:
- logic that assigns a corresponding priority level to each slave device, wherein at least two slave devices are assigned different corresponding priority levels;
- logic that assigns a corresponding count parameter to each of the slave devices;
- logic that assigns a corresponding initial count value to each of the slave devices;
- logic that, for each of the slave devices, initializes the corresponding count parameter to the corresponding initial count value;
- logic that, for each successive time slot, adjusts each of the count parameters; and
- logic that selects a highest priority slave device whose corresponding count parameter has reached or passed a predetermined value.

20. The apparatus of claim 19, wherein the logic that adjusts each of the count parameters comprises logic that decrements each of the count parameters by a predetermined adjustment amount.

21. The apparatus of claim 20, wherein the predetermined adjustment amount is equal to one.

22. The apparatus of claim 19, further comprising:
- logic that explicitly or implicitly polls the selected slave device; and
- logic that adjusts the corresponding count parameter of the selected slave device by an amount equal to the corresponding initial count value.

23. The apparatus of claim 22, further comprising logic that changes the initial count value of at least one slave device sometime after the selected slave has been explicitly or implicitly polled.

24. The apparatus of claim 23, wherein the logic that changes the initial count value of at least one slave device after the selected slave has been explicitly or implicitly polled performs this operation as a function of a status of a buffer of one of the slave devices.

25. The apparatus of claim 23, wherein the logic that changes the initial count value of at least one slave device after the selected slave has been explicitly or implicitly polled performs this operation as a function of a status of a buffer of said master device, wherein said buffer is associated with one of the slave devices.

26. The apparatus of claim 23, wherein the logic that changes the initial count value of at least one slave device after the selected slave has been explicitly or implicitly polled comprises logic that changes the initial count value by an amount that results in an exponential change.

27. The apparatus of claim 22, further comprising logic that reassigns the corresponding priority levels of at least two of the slave devices sometime after the selected slave has been explicitly or implicitly polled.

28. The apparatus of claim 22, wherein:
- an isochronous one of the slave devices provides an isochronous service having an isochronous transmission interval; and
- the apparatus further comprises logic that, for each message, adjusts the initial count value assigned to the isochronous one of the slave devices to be a first count value at the start of each isochronous transmission interval, and changes the initial count value assigned to the isochronous one of the slave devices to a second count value after a last packet associated with said each message is transmitted, wherein the first count value is not equal to the second count value.

29. The apparatus of claim 28, further comprising logic that, for each message, selects the second count value such that the second count value ensures that the isochronous one of the slave devices will be explicitly or implicitly polled at the start of a next isochronous transmission interval.

30. The apparatus of claim 19, further comprising:
- logic that determines whether a present slot is a synchronous connection oriented link slot, and if so, then delays explicitly or implicitly polling the selected slave device until an occurrence of a slot that is not a synchronous connection oriented link slot.

31. The apparatus of claim 30, further comprising:
- logic that suspends the adjusting of each of the count parameters if the present slot is a synchronous connection oriented link slot.

32. The apparatus of claim 19, wherein:
- the n slave devices include one or more synchronous slave devices and one or more non-synchronous slave devices; and
- the logic that assigns the corresponding priority levels to each of the slave devices assigns the corresponding priority levels such that each of the one or more synchronous slave devices has a corresponding priority level that is higher than the corresponding priority level of any one of the one or more non-synchronous slave devices.

33. The apparatus of claim 32, wherein the logic that assigns the corresponding initial count value to each of the slave devices uses initial count values that ensure that the time slots utilized by the one or more synchronous slave devices are staggered with respect to one another.

34. The apparatus of claim 33, further comprising:
logic that, after initializing the corresponding count parameter to the corresponding initial count value, adjusts the initial count values of the one or more synchronous slave devices so that they will equal a corresponding synchronous connection oriented link interval.

35. An apparatus for selecting one of a number, n, of slave devices to be explicitly or implicitly polled by a master device in a communication system that transmits during individual ones of a number of sequentially occurring time slots, the apparatus comprising:
logic that assigns a different corresponding priority level to each of a number, n, of counters;
logic that assigns a corresponding one of the counters to each of the slave devices;
logic that assigns a corresponding initial count value to each of the slave devices;
logic that, for each of the slave devices, initializes the corresponding counter to the corresponding initial count value;
logic that, for each successive time slot, adjusts each of the counters;
logic that identifies a highest priority counter whose contents have reached or passed a predetermined value; and
logic that selects for express or implicit polling the slave device corresponding to the identified counter.

36. An apparatus for explicitly or implicitly polling one or more of a number, n, of slave devices by a master device in a communication system that transmits during individual ones of a number of sequentially occurring time slots, the apparatus comprising:
a) logic that assigns a different corresponding priority level to each of a number, n, of counters;
b) logic that assigns a corresponding one of the counters to each of the slave devices;
c) logic that assigns a corresponding initial count value to each of the slave devices;
d) logic that, for each of the slave devices, initializes the corresponding counter to the corresponding initial count value;
e) logic that periodically adjusts each of the counters by an amount equal to a number of time slots that have occurred since a last adjusting of each of the counters;
f) logic that identifies a highest priority counter whose contents have reached or passed a predetermined value;
g) logic that selects for express or implicit polling the slave device corresponding to the identified counter;
h) logic that explicitly or implicitly polls the selected slave device;
i) logic that adjusts the corresponding counter of the selected slave device by an amount equal to the corresponding initial count value; and
j) logic that causes logic e) through j) to operate repetitively.

* * * * *

UNITED STATES PATENT AND TRADEMARK OFFICE
CERTIFICATE OF CORRECTION

PATENT NO. : 7,016,372 B2 Page 1 of 1
DATED : March 21, 2006
INVENTOR(S) : Jacobus C. Haartsen It is certified that error appears in the above-identified patent and that said Letters Patent is hereby corrected as shown below:

Column 13,
Line 2, change "factor a each time α" to -- factor α each time a --.

Signed and Sealed this

Sixteenth Day of May, 2006

JON W. DUDAS
*Director of the United States Patent and Trademark Office*